United States Patent
Kim et al.

(10) Patent No.: US 10,972,329 B2
(45) Date of Patent: *Apr. 6, 2021

(54) METHOD AND DEVICE FOR TRANSMITTING AND RECEIVING PRIMARY SYNCHRONIZATION SIGNAL IN WIRELESS ACCESS SYSTEM SUPPORTING NARROWBAND INTERNET OF THINGS

(71) Applicant: LG ELECTRONICS INC., Seoul (KR)

(72) Inventors: Bonghoe Kim, Seoul (KR); Kijun Kim, Seoul (KR); Hyunsoo Ko, Seoul (KR); Byounghoon Kim, Seoul (KR); Yunjung Yi, Seoul (KR); Seokmin Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,561

(22) Filed: Jan. 24, 2020

(65) Prior Publication Data

US 2020/0162299 A1 May 21, 2020

Related U.S. Application Data

(63) Continuation of application No. 15/765,458, filed as application No. PCT/KR2016/011043 on Oct. 4, 2016, now Pat. No. 10,601,626.

(Continued)

(51) Int. Cl.
*H04W 56/00* (2009.01)
*H04L 27/26* (2006.01)
(Continued)

(52) U.S. Cl.
CPC ...... *H04L 27/2655* (2013.01); *H04J 11/0073* (2013.01); *H04L 5/005* (2013.01);
(Continued)

(58) Field of Classification Search
CPC ............ H04J 13/0062; H04L 27/2666; H04W 56/001
See application file for complete search history.

(56) References Cited

U.S. PATENT DOCUMENTS 10,601,626 B2 * 3/2020 Kim .................... H04L 27/2613
2013/0229953 A1   9/2013 Nam et al.
(Continued)

FOREIGN PATENT DOCUMENTS

WO   2015111908   7/2015

OTHER PUBLICATIONS

PCT International Application No. PCT/KR2016/011043, Written Opinion of the International Searching Authority dated Jan. 13, 2017, 19 pages.

(Continued)

*Primary Examiner* — Salvador E Rivas
(74) *Attorney, Agent, or Firm* — Lee, Hong, Degerman, Kang & Waimey

(57) ABSTRACT

The present invention provides a method and devices for transmitting and receiving a synchronization signal and a method for generating a synchronization signal in a wireless access system supporting narrowband Internet of Things (NB-IoT). A method for transmitting a primary synchronization signal (PSS) by a base station in a wireless access system supporting narrowband Internet of Things (NB-IoT), according to an embodiment of the present invention, can comprise the steps of: repeatedly generating first sequences n times so as to generate primary synchronization signals; multiplying n first sequences by second sequences and thus (Continued)

generating n primary synchronization signals; and transmitting n primary synchronization signals by means of n OFDM symbols, respectively. The size of a bandwidth used in the wireless access system supporting NB-IoT is the size of one physical resource block (PRB), and one PRB can comprise twelve subcarriers in a frequency domain.

8 Claims, 19 Drawing Sheets

Related U.S. Application Data

(60) Provisional application No. 62/236,849, filed on Oct. 2, 2015, provisional application No. 62/264,875, filed on Dec. 9, 2015, provisional application No. 62/266,004, filed on Dec. 11, 2015, provisional application No. 62/311,972, filed on Mar. 23, 2016.

(51) Int. Cl.
*H04L 5/00* (2006.01)
*H04J 11/00* (2006.01)
*H04W 72/04* (2009.01)
*H04W 76/28* (2018.01)
*H04W 76/27* (2018.01)
*H04B 7/06* (2006.01)
*H04J 13/00* (2011.01)

(52) U.S. Cl.
CPC ........ *H04L 5/0053* (2013.01); *H04L 27/2613* (2013.01); *H04L 27/2666* (2013.01); *H04L 27/2692* (2013.01); *H04W 56/001* (2013.01); *H04W 72/042* (2013.01); *H04B 7/0626* (2013.01); *H04J 13/0062* (2013.01); *H04L 5/001* (2013.01); *H04W 76/27* (2018.02); *H04W 76/28* (2018.02)

(56) References Cited

U.S. PATENT DOCUMENTS

| | | | |
|---|---|---|---|
| 2014/0171073 A1* | 6/2014 | Kim | .................... H04W 56/001 455/434 |
| 2015/0195069 A1 | 7/2015 | Yi et al. | |
| 2017/0093540 A1* | 3/2017 | Lei | ....................... H04J 11/0069 |
| 2018/0287844 A1 | 10/2018 | Kim et al. | |

OTHER PUBLICATIONS

QUALCOMM, "Sequence Design for NB-IOT SYNC Channel", 3GPP TSG RAN WG1 Meeting #82bis, R1-155747, Oct. 2015, 4 pages.
QUALCOMM, "Design Principles for NB-IoT SYNC Channel", 3GPP TSG RAN WG1 Meeting #82bis, R1-155746, Oct. 2015, 6 pages.
United States Patent and Trademark Office U.S. Appl. No. 15/765,458, Office Action dated Mar. 7, 2019, 14 pages.
United States Patent and Trademark Office U.S. Appl. No. 15/765,458, Final Office Action dated Jun. 27, 2019, 13 pages.

* cited by examiner

FIG. 8
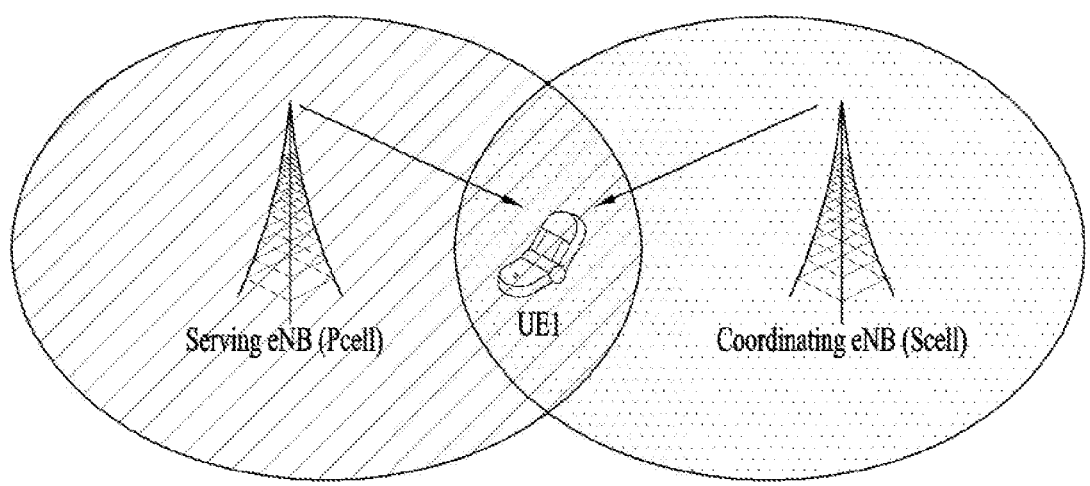
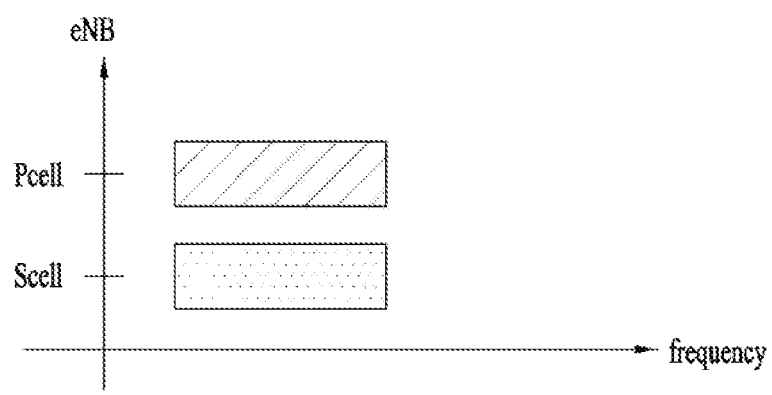

METHOD AND DEVICE FOR TRANSMITTING AND RECEIVING PRIMARY SYNCHRONIZATION SIGNAL IN WIRELESS ACCESS SYSTEM SUPPORTING NARROWBAND INTERNET OF THINGS

CROSS-REFERENCE TO RELATED APPLICATIONS

This application is a continuation of U.S. patent application Ser. No. 15/765,458, filed on Apr. 2, 2018, now U.S. Pat. No. 10,601,626, which is the National Stage filing under 35 U.S.C. 371 of International Application No. PCT/KR2016/011043, filed on Oct. 4, 2016, which claims the benefit of U.S. Provisional Application No. 62/236,849, filed on Oct. 2, 2015, 62/264,875, filed on Dec. 9, 2015, 62/266,004, filed on Dec. 11, 2015, and 62/311,972, filed on Mar. 23, 2016, the contents of which are all incorporated by reference herein in their entireties.

TECHNICAL FIELD

The present disclosure relates to a wireless access system supporting narrowband Internet of things (NB-IoT), and more particularly, to a method for generating a synchronization signal, a method for transmitting and receiving a synchronization signal, and apparatuses.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An aspect of the present disclosure is to provide a method for transmitting and receiving data and/or control information for a narrowband Internet of things (NB-IoT) user equipment (UE).

Another aspect of the present disclosure is to provide a method for generating a primary synchronization signal and a secondary synchronization signal in an NB-IoT system.

Another aspect of the present disclosure is to provide a method for transmitting and receiving a primary synchronization signal and a secondary synchronization signal in an NB-IoT system.

Another aspect of the present disclosure is to provide apparatuses supporting the above methods.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings

Technical Solution

The present disclosure provides a method for generating a synchronization signal, a method for transmitting and receiving a synchronization signal, and apparatuses in a wireless access system supporting narrowband Internet of things (NB-IoT).

According to an aspect of the present disclosure, a method of transmitting a primary synchronization signal (PSS) in a wireless access system supporting narrowband Internet of things (NB-IoT) includes repeatedly generating a first sequence N times in order to generate the PSS, multiplying the N first sequences by a second sequence to generate N PSSs, and transmitting the N PSSs through N orthogonal frequency division multiplexing (OFDM) symbols. At this time, a bandwidth used in the wireless access system supporting NB-IoT is one PRB, and the PRB includes 12 subcarriers in the frequency domain.

According to another aspect of the present disclosure, a base station for transmitting a primary synchronization signal (PSS) in a wireless access system supporting narrowband Internet of things (NB-IoT) includes a transmitter and a processor. The processor is configured to repeatedly generate a first sequence N times in order to generate the PSS, to multiply the N first sequences by a second sequence to generate N PSSs, and to control the transmitter to transmit the N PSSs through N orthogonal frequency division multiplexing (OFDM) symbols. At this time, a bandwidth used in the wireless access system supporting NB-IoT is one PRB, and the PRB includes 12 subcarriers in the frequency domain.

In the aspects, the base station may transmit the N OFDM symbols with "0" filled in resource elements, to which the PSSs are not allocated.

The N OFDM symbols may be included in one subframe. The N OFDM symbols may include OFDM symbols except for a control region in the subframe.

The first sequence may be generated from a Zadoff-Chu (ZC) sequence.

The second sequence may be determined in consideration of the number of OFDM symbols in which the PSS signals are transmitted.

It is to be understood that both the foregoing general description and the following detailed description of the present disclosure are exemplary and explanatory and are intended to provide further explanation of the disclosure as claimed.

Advantageous Effects

Accordingly, the present disclosure provides the following effects and/or advantages.

First, data and/or control information for a narrowband Internet of things (NB-IoT) user equipment (UE) can be efficiently transmitted and received.

Secondly, as methods for generating a primary synchronization signal (PSS) and a secondary synchronization signal (SSS) used in an NB-IoT system are defined, an NB-IoT UE can efficiently acquire time and frequency synchronization even in an NB-IoT system.

Thirdly, as methods for generating an SSS used in an NB-IoT system are provided, a UE can acquire a physical cell identifier (ID) of a serving cell, subframe position information, and so on in the NB-IoT system.

Fourthly, as a method for transmitting and receiving a PSS and an SSS in a narrowband applied to an NB-IoT system is provided, a UE can actively synchronize with a base station (BS).

It will be apparent to those skilled in the art that various modifications and variations can be made in the present disclosure within the scope of the appended claims and the embodiments described in the descriptions hereinafter.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 8 is a conceptual view of a coordinated multi-point (CoMP) system operating in a CA environment;

BEST MODE FOR CARRYING OUT THE INVENTION

Figure 1:
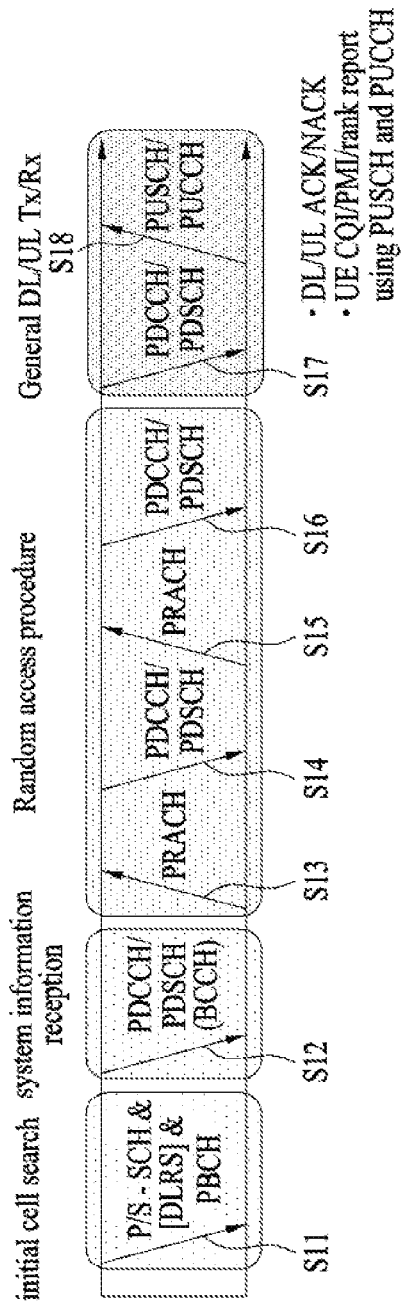
FIG. 1 is a view illustrating physical channels and a signal transmission method using the physical channels.

Embodiments of the present disclosure as described below in detail relate to a wireless access system supporting narrowband Internet of things (NB-IoT), and more particularly, to a method for generating a synchronization signal, and a method and apparatuses for transmitting and receiving a synchronization signal.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1.3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell identifier (ID) by receiving a primary synchronization channel (P-SCH) and a secondary synchronization channel (S-SCH) from the eNB.

Then the UE may acquire information broadcast in the cell by receiving a physical broadcast channel (PBCH) from the eNB.

During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH (S12).

To complete connection to the eNB, the UE may perform a random access procedure with the eNB (S13 to S16). In the random access procedure, the UE may transmit a preamble on a physical random access channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a physical uplink shared channel (PUSCH) and/or a physical uplink control channel (PUCCH) to the eNB (S18), in a general UL/DL signal transmission procedure.

Control information that the UE transmits to the eNB is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
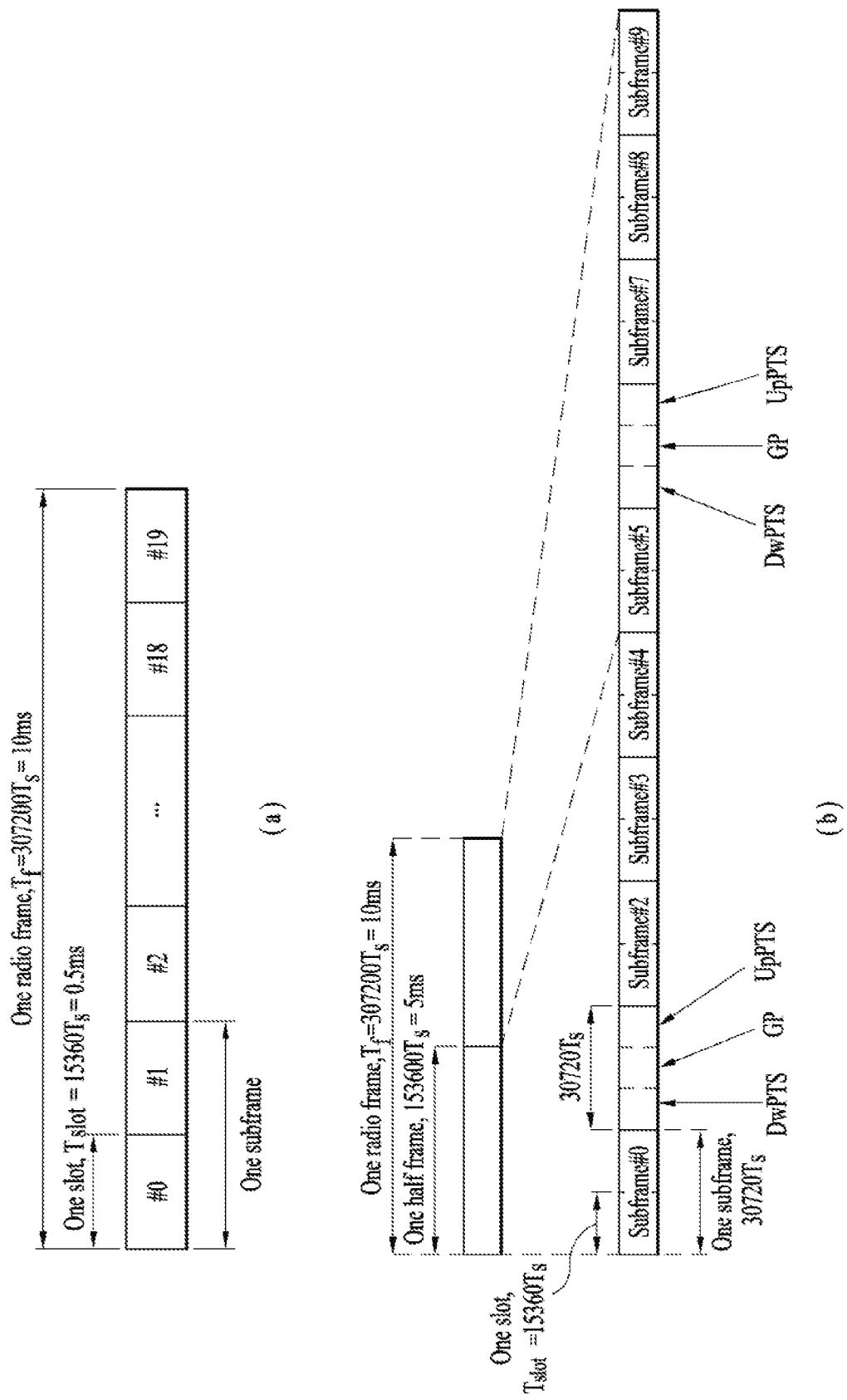
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full frequency division duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a transmission time interval (TTI). Ts is a sampling time given as Ts=1/(15 kHz×2048)=3.2552×10-8 (about 33 ns). One slot includes a plurality of orthogonal frequency division multiplexing (OFDM) symbols or SC-FDMA symbols in the time domain by a plurality of resource blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a time division duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, downlink pilot time slot (DwPTS), guard period (GP), and uplink pilot time slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

number of RBs in a DL slot, NDL depends on a DL transmission bandwidth. A UL slot may have the same structure as a DL slot.

Figure 4:
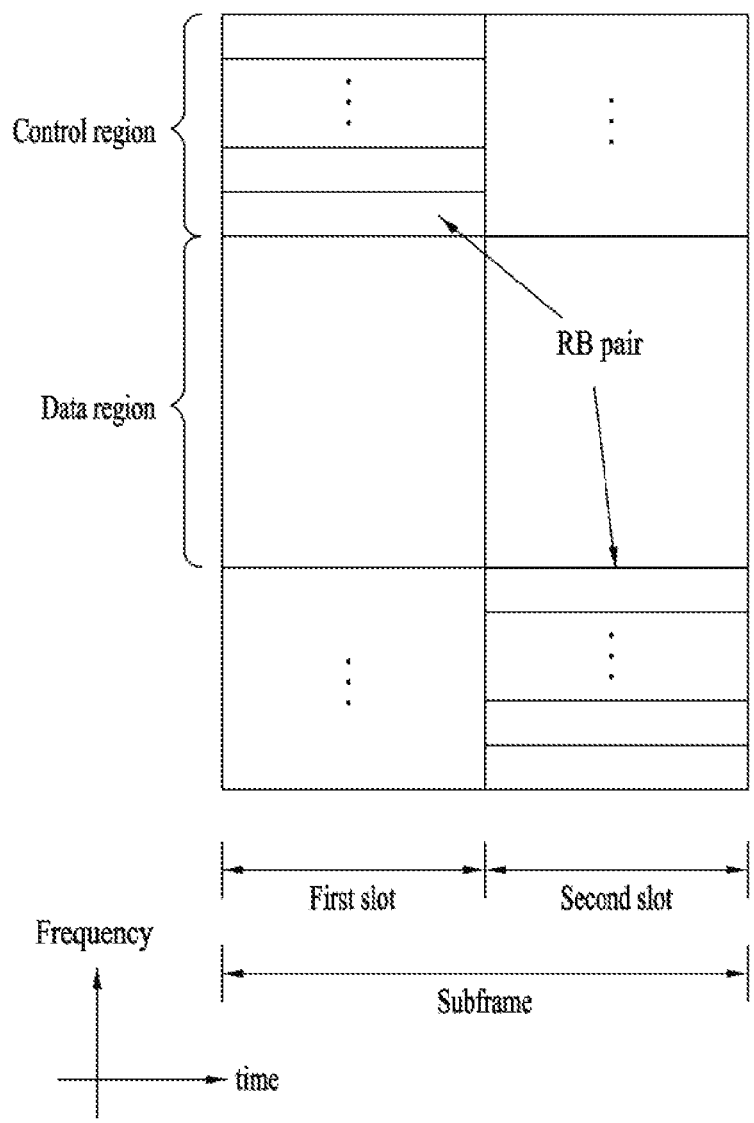
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
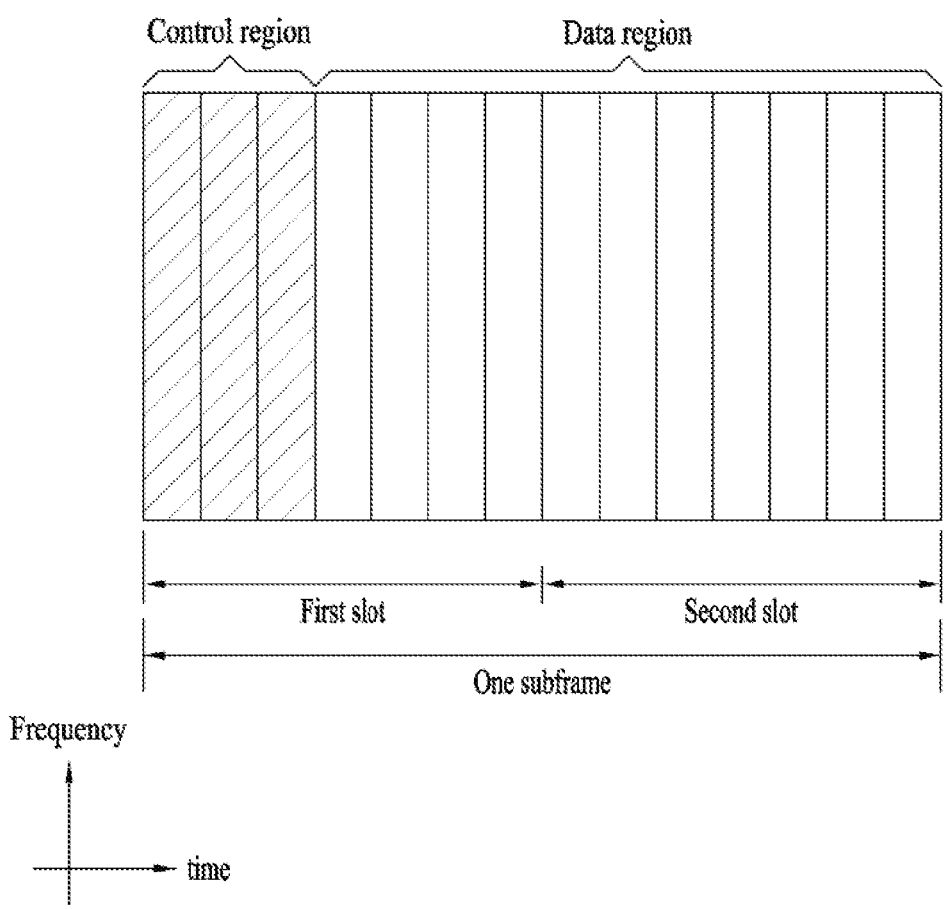
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a physical control format indicator channel (PCFICH), a PDCCH, and a physical hybrid ARQ indicator channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called downlink control information (DCI). The DCI transports UL resource assignment information, DL resource assignment information, or UL transmission (Tx) power control commands for a UE group.

1.2 Physical Downlink Control Channel (PDCCH)

1.2.1 PDCCH Overview

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
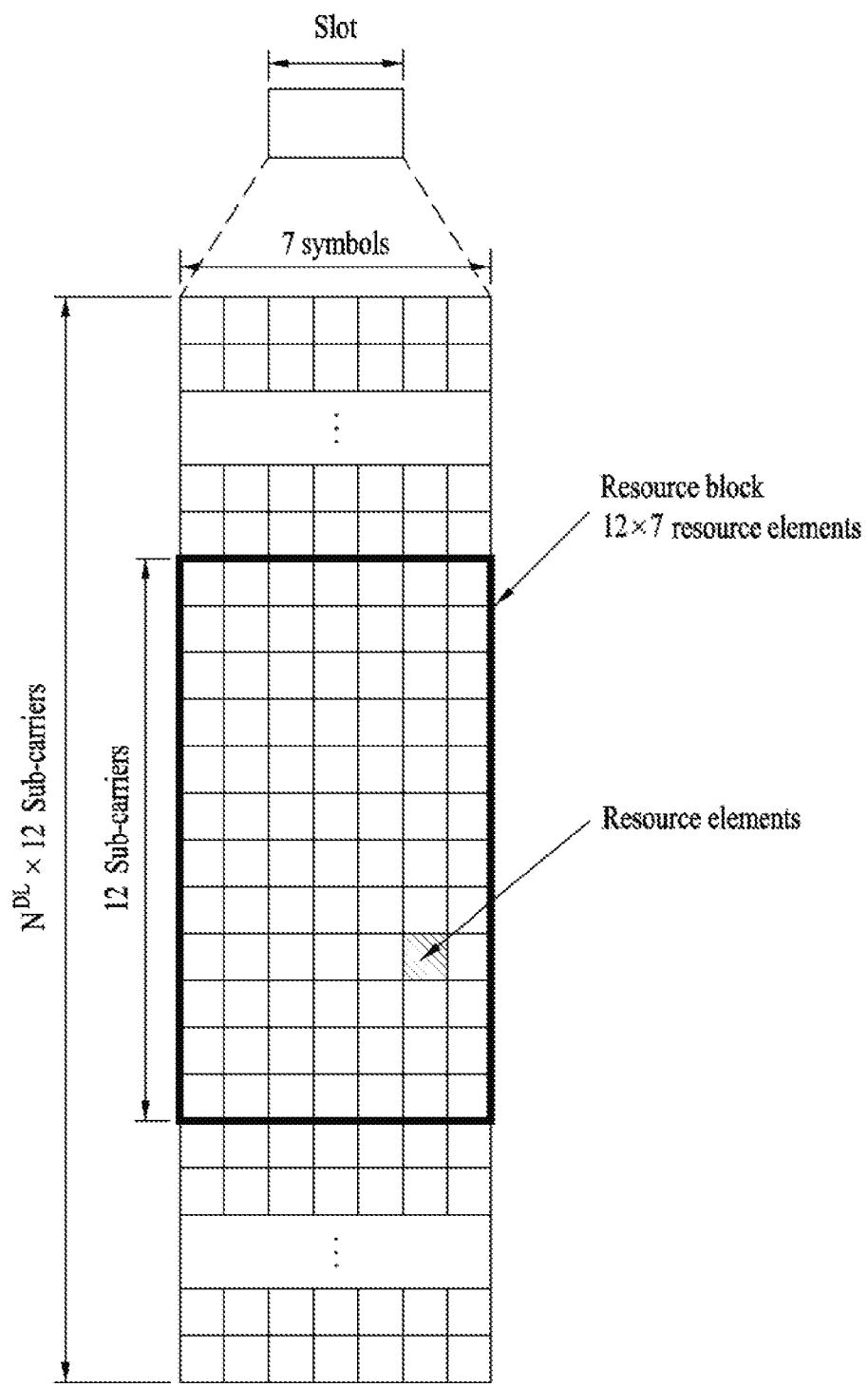
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a resource element (RE). An RB includes 12×7 REs. The The PDCCH may deliver information about resource allocation and a transport format for a downlink shared channel (DL-SCH) (i.e. a DL grant), information about resource allocation and a transport format for an uplink shared channel (UL-SCH) (i.e. a UL grant), paging information of a paging channel (PCH), system information on the DL-SCH, information about resource allocation for a higher-layer control message such as a random access response transmitted on the PDSCH, a set of Tx power control commands for individual UEs of a UE group, voice over Internet protocol (VoIP) activation indication information, etc.

A plurality of PDCCHs may be transmitted in the control region. A UE may monitor a plurality of PDCCHs. A PDCCH is transmitted in an aggregate of one or more consecutive control channel elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four quadrature phase shift keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE−1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or modulation and coding scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUS CH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3 A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of transmission power control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. radio resource control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, multi-user multiple input multiple output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the signal to interference plus noise ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:
 (1) Transmission mode 1: Single antenna port (port 0);
 (2) Transmission mode 2: Transmit diversity;
 (3) Transmission mode 3: Open-loop spatial multiplexing when the number of layer is larger than 1 or Transmit diversity when the rank is 1;
 (4) Transmission mode 4: Closed-loop spatial multiplexing;
 (5) Transmission mode 5: MU-MIMO;
 (6) Transmission mode 6: Closed-loop rank-1 precoding;
 (7) Transmission mode 7: Precoding supporting a single layer transmission, which is not based on a codebook (Rel-8);
 (8) Transmission mode 8: Precoding supporting up to two layers, which are not based on a codebook (Rel-9);
 (9) Transmission mode 9: Precoding supporting up to eight layers, which are not based on a codebook (Rel-10); and
 (10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a cyclic redundancy check (CRC) to the control information. The CRC is masked by a unique identifier (ID) (e.g. a radio network temporary identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a paging-RNTI (P-RNTI)). If the PDCCH carries system information, particularly, a system information block (SIB), its CRC may be masked by a system information ID (e.g. a system information RNTI (SI-RNTI)). To indicate that the PDCCH carries a random access response to a random access preamble transmitted by a UE, its CRC may be masked by a random access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k−1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a discontinuous reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of search space (SS) is defined for blind decoding of a UE. An SS is a set of PDCCH candidates that a UE will monitor. The SS may have a different size for each PDCCH format. There are two types of SSs, common search space (CSS) and UE-specific/dedicated search space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH Format | Number of CCE (n) | Number of candidates in CSS | Number of candidates in USS |
| --- | --- | --- | --- |
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format 0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$.

The CCEs of PDCCH candidate set m in the SS may be determined by the following equation.

$$L \cdot \{(Y_k+m) \bmod \lfloor N_{CCE,k}/L \rfloor\}+i \quad \text{[Equation 1]}$$

Herein, $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$. $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k(A \cdot Y_{k-1}) \bmod D \quad \text{[Equation 2]}$$

Herein, $Y_{-1}=n_{RNTI} \neq 0$, $n_{RNTI}$ indicating an RNTI value. A=39827 and D=65537.

1.3 Carrier Aggregation (CA) Environment 1.3.1 CA Overview

A 3GPP LTE system (conforming to Rel-8 or Rel-9) (hereinafter, referred to as an LTE system) uses multi-carrier Modulation (MCM) in which a single component carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of radio frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a primacy cell (PCell) and a secondary cell (SCell) are defined. A PCell and an SCell may be used as serving cells. For a UE in RRC CONNECTED state, if CA is not configured for the UE or the UE does not support CA, a single serving cell including only a PCell exists for the UE. On the contrary, if the UE is in RRC CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a primary CC (PCC) and a PCell may be used in the same meaning and a secondary CC (SCC) and an SCell may be used in the same meaning in embodiments of the present disclosure.

Figure 6:
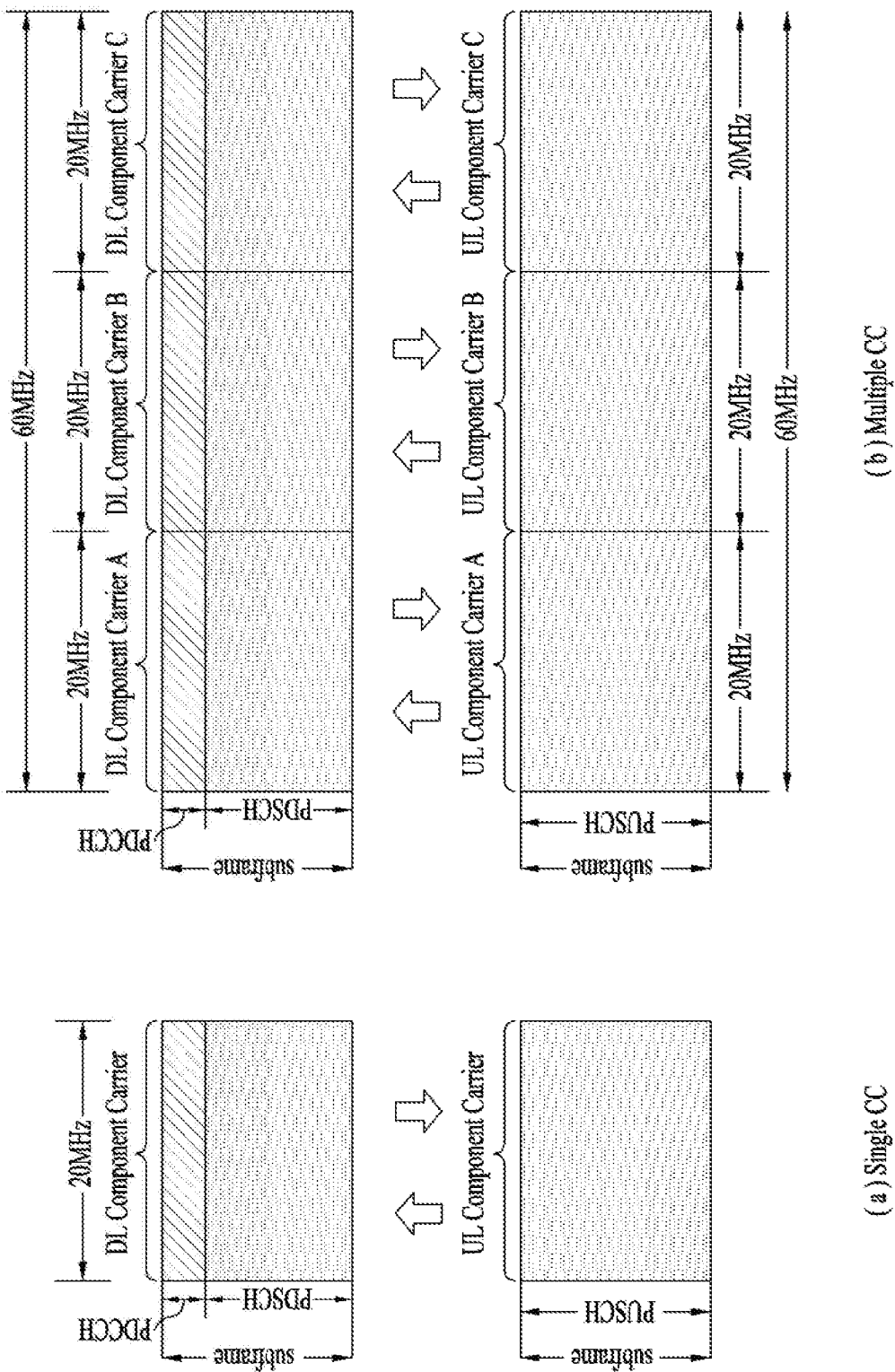
FIG. 6 is a view illustrating an example of component carriers (CCs) and carrier aggregation (CA) in a Long Term Evolution-Advanced (LTE-A) system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by system information block type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

1.3.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a carrier indicator field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
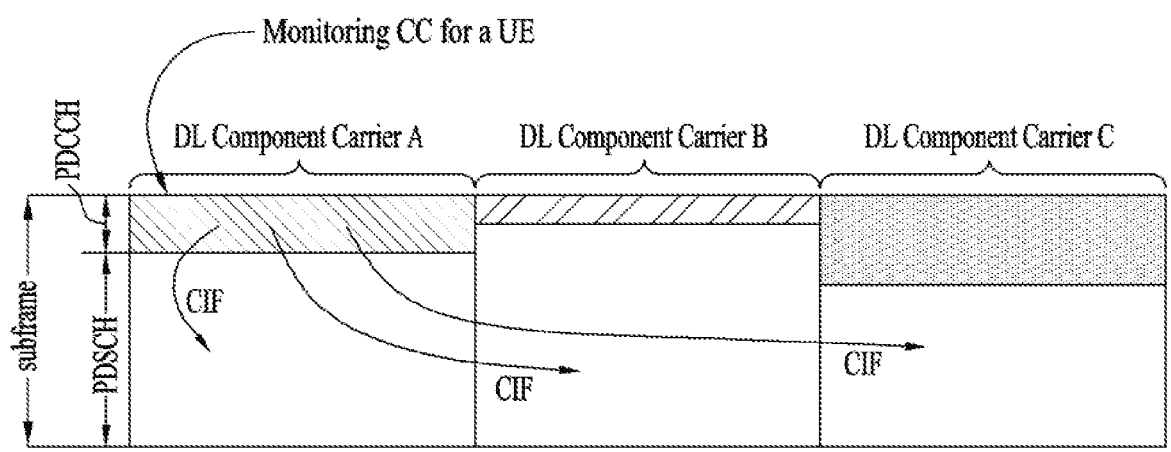
FIG. 7 is a view illustrating a subframe structure based on cross-carrier scheduling in the LTE-A system.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

1.3.3 CA Environment-Based CoMP Operation

Hereinafter, a cooperation multi-point (CoMP) transmission operation applicable to the embodiments of the present disclosure will be described.

In the LTE-A system, CoMP transmission may be implemented using a carrier aggregation (CA) function in the LTE. FIG. 8 is a conceptual view illustrating a CoMP system operating based on a CA environment.

In FIG. 8, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as joint transmission (JT), CS/CB and dynamic cell selection for one UE.

FIG. 8 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

1.4 System Information Block (SIB)

SIBs are used for an eNB to transmit system information. That is, a UE may acquire system information by receiving different SIBs from the eNB. The SIBs are transmitted on a DL-SCH at the logical layer, and on a PDSCH at the physical layer. It is determined whether there is an SIB, by a PDCCH signal masked with a System Information Radio Network Temporary Identifier (SI-RNTI).

Among the SIBs, SIB type 1 (SIB1) includes parameters required to determine whether a corresponding cell is suitable for cell selection, and information about time-axis scheduling of other SIBs. SIB type 2 (SIB2) includes common channel information and shared channel information. SIB3 to SIB8 include cell reselection-related information, inter-frequency information, intra-frequency information, and so on. SIB9 is used to indicate the name of a home eNode B (HeNB), and SIB10, SIB11, and SIB12 include an earthquake and tsunami warning service (ETWS) notification and a commercial mobile alert system (CMAS) alert message. SIB13 includes multimedia broadcast multicast service (MBMS)-related control information.

Herein, SIB1 includes cell access-related parameters and scheduling information about other SIBs. SIB1 is transmitted every 80 ms, and a UE should be able to receive SIB1 in idle mode/connected mode. SIB1 is transmitted every 80 ms, and a UE should be able to receive SIB1 in idle mode/connected mode. Transmission of SIB1 starts in subframe #5 of a radio frame satisfying SFN mod 8=0 and proceeds in subframe #5 of a radio frame satisfying SFN mod 2=0. SIB1 is transmitted, including the following information.

TABLE 6

```
SystemInformationBlockType1 ::=          SEQUENCE {
    cellAccessRelatedInfo                SEQUENCE {
        plmn-IdentityList                    PLMN-IdentityList,
        trackingAreaCode                     TrackingAreaCode,
        cellIdentity                         CellIdentity,
        cellBarred                           ENUMERATED {barred, notBarred},
        intraFreqReselection                 ENUMERATED {allowed, notAllowed},
        csg-Indication                       BOOLEAN,
        csg-Identity                         CSG-Identity            OPTIONAL    -- Need OR
    },
    cellSelectionInfo                    SEQUENCE {
        q-RxLevMin                           Q-RxLevMin,
        q-RxLevMinOffset                         INTEGER (1..8)      OPTIONAL    -- Need OP
    },
    p-Max                                    P-Max                   OPTIONAL,   -- Need OP
    freqBandIndicator                    FreqBandIndicator,
    schedulingInfoList                   SchedulingInfoList,
    tdd-Config                               TDD-Config              OPTIONAL,   -- Cond TDD
    si-WindowLength                          ENUMERATED {
                                             ms1, ms2, ms5, ms10, ms15, ms20,
                                             ms40},
    systemInfoValueTag                       INTEGER (0..31),
    nonCriticalExtension                     SystemInformationBlockType1-v890-IEs   OPTIONAL
}
SchedulingInfoList ::= SEQUENCE (SIZE (1..maxSI-Message)) OF SchedulingInfo
SchedulingInfo ::= SEQUENCE {
    si-Periodicity                           ENUMERATED {
                                             rf8, rf16, rf32, rf64, rf128, rf256, rf512},
    sib-MappingInfo                          SIB-MappingInfo
}
SIB-MappingInfo ::= SEQUENCE (SIZE (0..maxSIB-1)) OF SIB-Type
SIB-Type ::=                                 ENUMERATED {
                                             sibType3, sibType4, sibType5, sibType6,
                                             sibType7, sibType8, sibType9, sibType10,
                                             sibType11, sibType12-v920, sibType13-v920,
                                             sibType14-v1130, sibType15-v1130,
                                             sibType16-v1130, sibType17-v12xy, spare1, ...}
```

For a description of the parameters included in SIB1, as listed in [Table 6], refer to sub-clauses 5.2.2.7 and 6.2.2 of 3GPP TS 36.331.

SI messages may be transmitted within a time area (i.e., an SI window) generated periodically by dynamic scheduling. Each SI message is related to a specific SI window, and the specific SI windows do not overlap with other SI messages. A common SI window length may be set for all SI messages.

Within an SI window, a corresponding SI message is transmitted a plurality of times in all subframes except for MBSFN subframes, and UL subframes and subframes #5 of radio frames satisfying SFN mod 2=0 in TDD. A UE may acquire specific time-domain scheduling information from SI messages.

RVs are determined for a PDSCH scheduled by a PDCCH masked with an SI-RNTI in DCI format 1C, according to the following [Equation 3].

$$RV_K = \text{ceiling}(3/2*k) \text{modulo } 4 \quad \text{[Equation 3]}$$

In [Equation 3], k is determined according to the type of an SI message. For example, k=(SFN/2) modulo 4 for an SIB1 message. Here, SFN represents a system frame number. For each piece of system information, k=i modulo 4 and i=0, 1, . . . , nsw−1 where i represents the number of a subframe within an SI window $n_s^w$.

1.5 Method for Transmitting Paging Message

A paging message is used to deliver paging information, SI message update information, a public warning system (PWS) message, or the like. A default paging cycle may be set for each cell and a dedicated paging cycle may be set for each UE, for transmission of a paging message. If two or more paging cycles are set for a UE, a minimum paging cycle becomes the paging cycle of the UE.

Paging subframes available for transmission of a paging message may be calculated by [Equation 4].

$$\text{SFN mod } T = (T/N) \times (\text{UE\_ID mod } N) \quad \text{[Equation 4]}$$

In embodiments of the present disclosure, i_s represents an index indicating a predefined table that defines paging subframes, and i_s=floor(UE_ID/N) mod NS. In [Equation 4], T is the UE discontinuous reception (DRX) cycle of the UE and may be given as T=min(Tc,TUE) where Tc is a cell-specific default paging cycle which may be set to {32, 64, 128, 256} radio frames, and TUE is a UE-specific paging cycle which may be set to {32, 64, 128, 256} radio frames. N represents the number of paging frames within one paging cycle, and may be given as N=min(T, nB) where nB is the number of paging subframes per paging cycle {4T, 2T, T, T/2, T/4, T/8, T/16, T/32}. NS represents the number of paging subframes in a radio frame used for paging and it is configured that Ns=max(1, nB/T).

[Table 7] and [Table 8] below illustrate paging subframe patterns in FDD and TDD, respectively.

TABLE 7

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 8

| Ns | PO when i_s = 0 | PO when i_s = 1 | PO when i_s-2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

[Table 9] illustrates exemplary paging subframes determined according to [Equation 4] and paging-related parameters.

TABLE 9

| Case | UE_ID | $T_c$ | $T_{UE}$ | T | nB | N | $N_s$ | PF | i_s | PO |
|---|---|---|---|---|---|---|---|---|---|---|
| A | 147 | 256 | 256 | 256 | 64 | 64 | 1 | 76 | 0 | 9 |
| B | 147 | 256 | 128 | 128 | 32 | 32 | 1 | 76 | 0 | 9 |
| C | 147 | 256 | 128 | 128 | 256 | 128 | 2 | 19 | 1 | 4 |

1.6 Reference Signal (RS)

Now, a description will be given of RSs that may be used in embodiments of the present disclosure.

Figure 9:
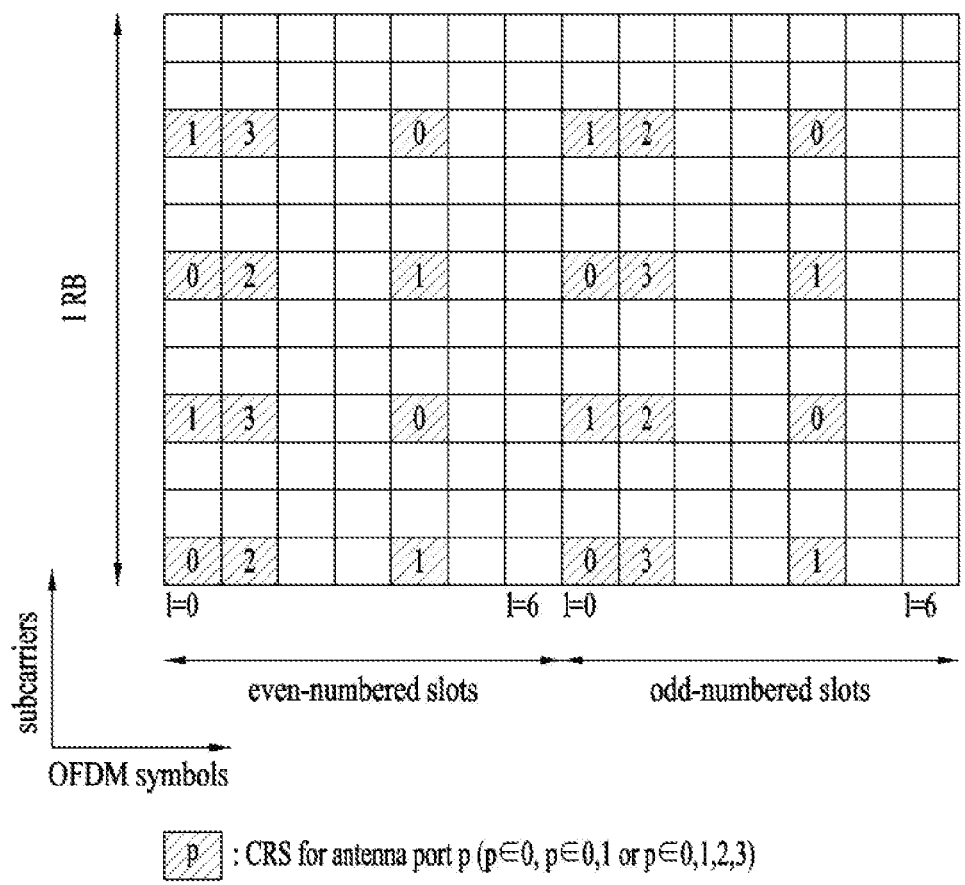
FIG. 9 is a view illustrating an exemplary subframe to which cell-specific reference signals (CRSs) are allocated, which may be used in embodiments of the present disclosure.

FIG. 9 is a view illustrating an exemplary subframe in which cell-specific reference signals (CRSs) are allocated, which may be used in embodiments of the present disclosure.

FIG. 9 illustrates a CRS allocation structure, when a system supports four antennas. CRS is used for the purpose of decoding and channel state measurement in the 3GPP LTE/LTE-A system. Therefore, CRSs are transmitted across a total DL bandwidth in every DL subframe in a cell supporting PDSCH transmission, and through all antenna ports configured for an eNB.

Specifically, a CRS sequence is mapped to complex-valued modulation symbols used as reference symbols for antenna port p in slot ns.

A UE may measure CSI using CRSs and decode a DL data signal received on a PDSCH in a subframe including CRSs, using the CRSs. That is, the eNB transmits CRSs at predetermined positions in every RB, and the UE performs channel estimation based on the CRSs and then detects the PDSCH. For example, the UE measures signals received in CRS REs. The UE may detect a PDSCH signal in REs to which the PDSCH is mapped, based on the ratio between per-CRS RE reception energy and per-PDSCH RE reception energy.

If a PDSCH signal is transmitted based on CRSs in this manner, the eNB should transmit CRSs in all RBs, resulting in unnecessary RS overhead. To solve the problem, the 3GPP LTE-A system additionally defines UE-specific RS (hereinafter, referred to as UE-RS) and channel state information reference signal (CSI-RS) as well as CRS. UE-RS is used for demodulation, and CSI-RS is used for deriving CSI.

Since UE-RS and CRS are used for demodulation, they may be referred to as demodulation RS in terms of their usage. That is, UE-RS may be regarded as a kind of Demodulation Reference Signal (DM-RS). Further, since CSI-RS and CRS are used for channel measurement or channel estimation, they may be regarded as channel state measurement RS in terms of their usage.

Figure 10:
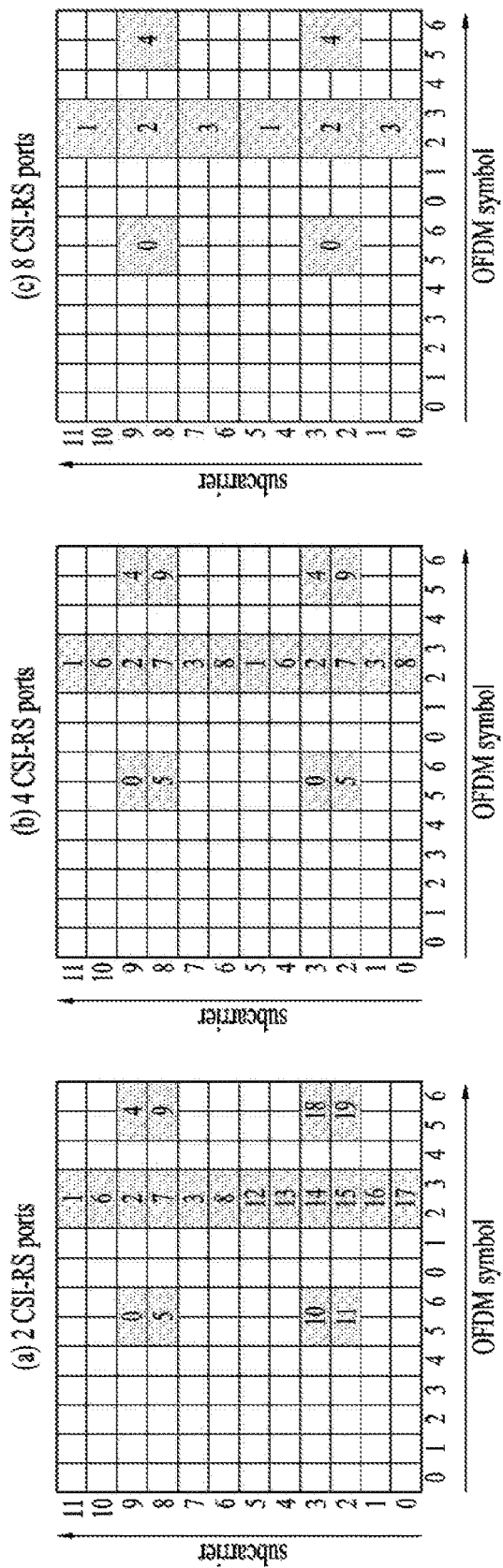
FIG. 10 is a view illustrating exemplary subframes to which channel state information reference signals (CSI-RSs) are allocated according to numbers of antenna ports, which may be used in embodiments of the present disclosure.

FIG. 10 is a view illustrating exemplary subframes in which CSI-RSs are allocated according to numbers of antenna ports, which may be used in embodiments of the present disclosure.

CSI-RS is a DL RS which has been introduced to the 3GPP LTE-A system, for the purpose of radio channel state measurement, not demodulation. The 3GPP LTE-A system defines a plurality of CSI-RS configurations for CSI-RS transmission. A CSI-RS sequence is mapped to complex-valued modulation symbols used as reference symbols for antenna port p in subframes for which CSI-RS transmission is configured.

FIG. 10(a) illustrates 20 CSI-RS configurations, CSI-RS configuration 0 to CSI-RS configuration 19 available for CSI-RS transmission through 2 CSI ports, among CSI-RS configuration, FIG. 10(b) illustrates 10 CSI-RS configurations, CSI-RS configuration 0 to CSI-RS configuration 9 available for CSI-RS transmission through 4 CSI ports, among the CSI-RS configurations, and FIG. 10(c) illustrates 5 CSI-RS configurations, CSI-RS configuration 0 to CSI-RS configuration 4 available for CSI-RS transmission through 8 CSI ports, among the CSI-RS configurations.

Herein, a CSI-RS port refers to an antenna port configured for CSI-RS transmission. A different CSI-RS configuration is used according to the number of CSI-RS ports. Therefore, in spite of the same CSI-RS configuration number, the CSI-RS configuration is different for a different number of antenna ports configured for CSI-RS transmission.

Compared to CRSs configured to be transmitted in every subframe, CSI-RSs are configured to be transmitted in every predetermined transmission period corresponding to a plurality of subframes. Accordingly, the CSI-RS configuration differs according to a subframe for which CSI-RSs are configured as well as the positions of REs occupied by CSI-RSs in an RB pair.

Despite the same CSI-RS configuration number, the CSI-RS configuration may be considered to be different in a different subframe for CSI-RS transmission. For example, if a CSI-RS transmission period $T_{CSI-RS}$ is different or a starting subframe $\Delta$CSI-RS in which CSI-RS transmission is configured in a radio frame is different, the CSI-RS configuration may be considered to be different.

In order to distinguish (1) a CSI-RS configuration to which a CSI-RS configuration number is assigned from (2) a CSI-RS configuration which varies according to a CSI-RS configuration number, the number of CSI-RS ports, and/or a subframe for which CSI-RSs are configured, the latter CSI-RS configuration (2) will be referred to as a CSI-RS resource configuration, and the former CSI-RS configuration (1) will be referred to as a CSI-RS configuration or a CSI-RS pattern.

When the eNB indicates a CSI-RS resource configuration to a UE, the eNB may transmit to the UE information about the number of antenna ports used for transmission of CSI-RSs, a CSI-RS pattern, a CSI-RS subframe configuration ICSI-RS, a UE assumption on reference PDSCH transmission power for CSI feedback, Pc, a zero power (ZP) CSI-RS configuration list, a ZP CSI-RS subframe configuration, and so on.

The index of a CSI-RS subframe configuration, ICSI-RS is information that specifies a subframe configuration periodicity TCSI-RS for occurrence of CSI-RSs, and a subframe offset $\Delta$CSI-RS. [Table 10] below lists exemplary CSI-RS subframe configuration indexes, ICSI-RS according to TCSI-RS and $\Delta$CSI-RS.

TABLE 10

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |

TABLE 10-continued

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 35-74 | 40 | $I_{CSI-RS} - 35$ |
| 75-154 | 80 | $I_{CSI-RS} - 75$ |

Subframes satisfying [Equation 5] are CSI-RS subframes.

$$(10n_f + \lfloor n_s/2 \rfloor - \Delta_{CSI-RS}) \bmod T_{CSI-RS} = \quad \text{[Equation 5]}$$

A UE for which a transmission mode (TM) defined beyond 3GPP LTE-A (e.g., TM9 or a newly defined TM) has been configured may perform channel measurement using CSI-RSs, and decode a PDSCH using UE-RSs.

A UE for which a Transmission Mode (TM) defined beyond 3GPP LTE-A (e.g., TM9 or a newly defined TM) has been configured may perform channel measurement using CSI-RSs, and decode a PDSCH using UE-RSs.

1.7 Enhanced PDCCH (EPDCCH)

In cross-carrier scheduling (CCS) under a situation in which a plurality of components carriers (CCs=(serving) cells) are aggregated in the 3GPP LTE/LTE-A system, one scheduled CC may be pre-configured to be DL/UL-scheduled only by one other scheduling CC (i.e., so that a DL/UL grant PDCCH for the scheduled CC may be received). Basically, the scheduling CC may perform DL/UL scheduling for itself. In other words, an SS for a PDCCH that schedules a scheduling/scheduled CC in the CCS relationship may exist in the control channel region of every scheduling CC.

Meanwhile, the LTE system allocates the first n (n<=4) OFDM symbols of each subframe to transmission of physical channels, PDCCH, PHICH, and PCFICH carrying control information and allocates the other OFDM symbols of the subframe to PDSCH transmission in an FDD DL carrier or TDD DL subframes. The number of OFDM symbols used for transmission of control channels in each subframe may be indicated to UEs, dynamically on a physical channel such as the PCFICH or semi-statically by RRC signaling.

Figure 11:
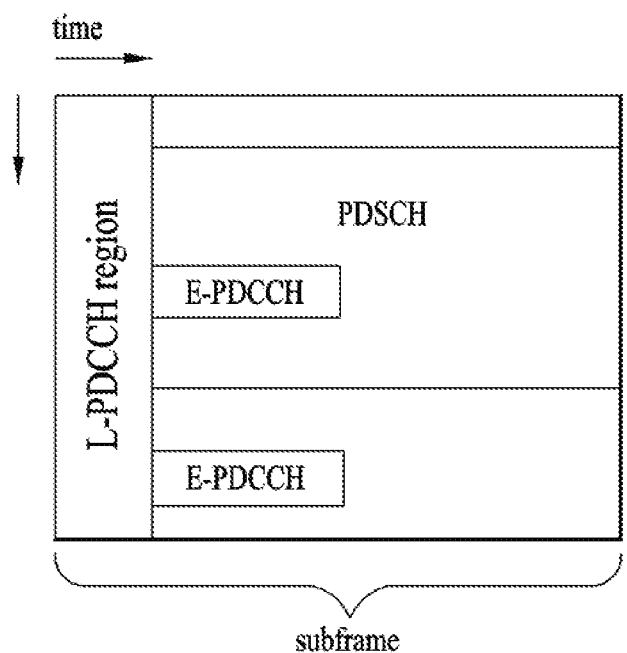
FIG. 11 is a view illustrating exemplary multiplexing of a legacy physical downlink control channel (PDCCH), a physical downlink shared channel (PDSCH), and an enhanced PDCCH (EPDCCH) in an LTE/LTE-A system.

A physical channel used for DL/UL scheduling and transmission of various types of control information, PDCCH has limitations such as transmission in limited OFDM symbols in the LTE/LTE-A system. Therefore, an extended PDCCH (i.e., EPDCCH) multiplexed more freely with a PDSCH in frequency division multiplexing (FDM)/time division multiplexing (TDM) may be introduced, instead of a control channel such as the PDCCH transmitted in OFDM symbols separate from PDSCH symbols. FIG. 11 is a view illustrating exemplary multiplexing of the legacy PDCCH, the PDSCH, and the EPDCCH in the LTE/LTE-A system.

1.8 Synchronization Signal

A synchronization signal (SS) includes a primary synchronization signal (PSS) and a secondary synchronization signal (SSS). The SS is a signal used for establishing synchronization between a UE and an eNB and performing cell search.

Figure 12:
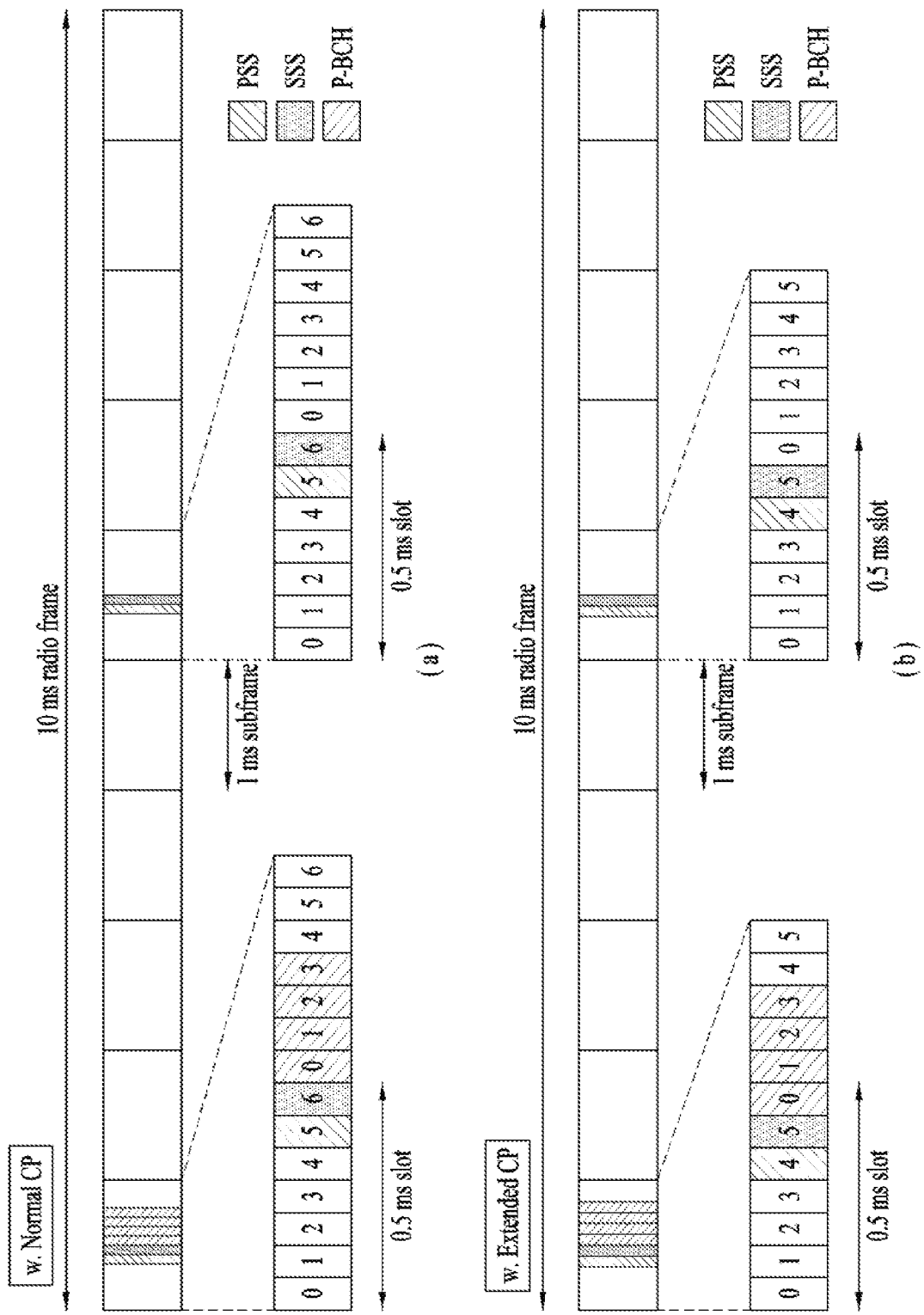
FIG. 12 is a view illustrating an exemplary frame structure showing a position for transmitting a synchronization signal.

FIG. 12 is a view illustrating an exemplary frame structure showing a position for transmitting a synchronization signal. In particular, FIG. 12(a) shows a frame structure for SS transmission in a system using a Cyclic Prefix (CP), and FIG. 12 (b) shows a frame structure for SS transmission in a system using an extended CP.

The SS is transmitted in a second slot in each of subframe κ and subframe κ in consideration of a GSM frame length of 4.6 ms for facilitation of inter-Radio Access Technology (inter-RAT) measurement. In this case, boundaries of a corresponding radio frame may be detected through the SSS.

Referring to FIG. 12(a) and FIG. 12(b), the PSS is transmitted in the last OFDM symbol of each of slot 0 and slot 5, and the SSS is transmitted in an OFDM symbol immediately before the OFDM symbol in which the PSS is transmitted. The SS can carry total 504 physical layer cell IDs (physical cell IDs) through combinations of 3 PSSs and 168 SSSs. In addition, the SS and a PBCH are transmitted within 6 RBs in the middle of the system bandwidth, and thus a UE can detect or decode the SS and PBCH irrespective of a transmission bandwidth size.

A transmission diversity scheme for the SS uses a single antenna port only. That is, a single antenna transmission scheme or a transmission scheme transparent to a UE (e.g., PVS, TSTD, CDD, etc.) may be used.

1.8.1 Primary Synchronization Signal (PSS)

A Zadoff-Chu (ZC) sequence of length 63 is defined in the frequency domain and the sequence is used as a sequence for the PSS. The ZC sequence can be defined according to Equation 6.

$$d_u(n) = e^{-j\frac{\pi u n(n+1)}{N_{ZC}}} \quad \text{[Equation 6]}$$

In Equation 6, NZC indicates the length of the ZC sequence, 63 and du(n) indicates the PSS sequence in accordance with a root index, u. In this case, a sequence element corresponding to a direct current (DC) subcarrier, n=31 is punctured.

In order to facilitate designing a filter for performing synchronization, 9 remaining subcarriers among 6 RBs (i.e., 72 subcarriers) in the middle of the bandwidth are always set to 0 and then transmitted. To define total 3 PSSs, u may have the values of 25, 29 and 34 in Equation 2 (i.e., u=25, 29 and 34). In this case, since u=29 and u=34 are in a conjugate symmetry relation, two correlations may be simultaneously performed. Here, the conjugate symmetry means a relation in Equation 3 below. A one-shot correlator for u=29 and u=34 can be implemented using conjugate symmetry characteristics, and the total amount of calculation can be reduced by about 33.3%.

$$d_u(n) = (-1)^n (d_{N_{ZC}-u}(n))^*, \text{ when } N_{ZC} \text{ is even number.}$$

$$d_u(n) = (d_{N_{ZC}-u}(n))^*, \text{ when } N_{ZC} \text{ is odd number.} \quad \text{[Equation 7]}$$

1.8.2 Secondary Synchronization Signal (SSS)

The SSS is generated by interleaving and concatenating two m-sequences each of length 31. In this case, 168 cell group IDs can be distinguished by combining the two sequences. As a sequence for the SSS, the m-sequence has a robust property in a frequency-selective environment. In addition, the amount of calculation can be reduced by applying high-speed m-sequence transformation using Fast Hadamard Transform. Moreover, to reduce the amount of calculation of a UE, it is proposed that the SSS is composed of two short codes.

Figure 13:
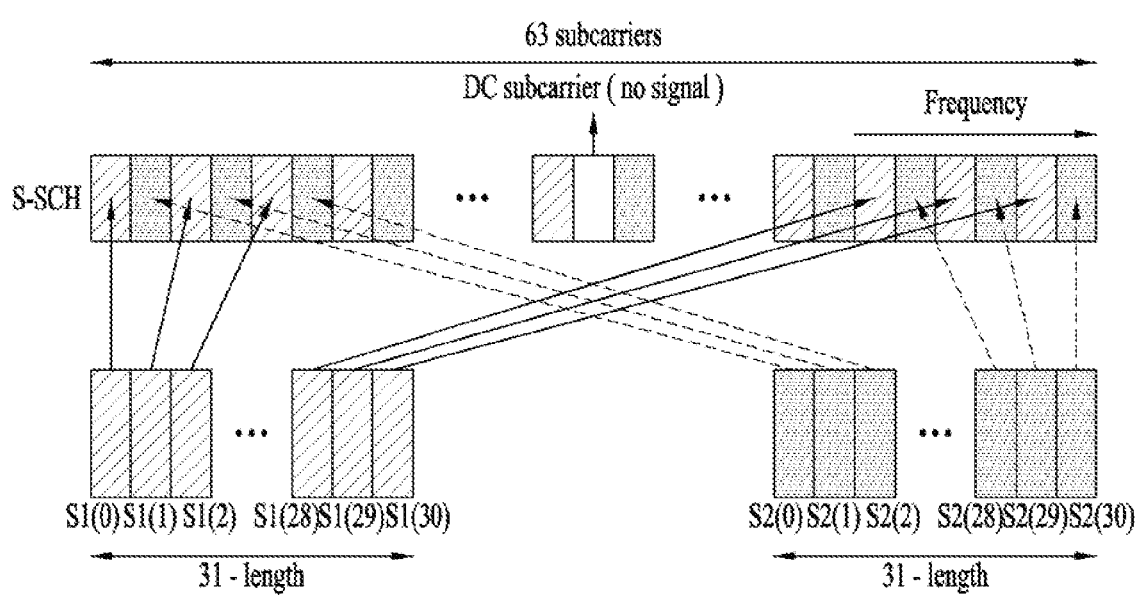
FIG. 13 is a view illustrating a method for generating a secondary synchronization signal (SSS)

FIG. 13 is a view illustrating a method for generating a secondary synchronization signal.

Referring to FIG. 13, it can be seen that two sequences defined in the logical domain are interleaved and mapped in the physical domain. For example, two m-sequences used for generating an SSS code may be respectively defined as S1 and S2. In this case, if an SSS in subframe index 0 carries a cell group ID through a combination of (S1, S2) and an SSS in subframe index 5 is transmitted by being swapped as (S2, S1), it is possible to distinguish between boundaries of a 10 ms frame. In this case, a generation polynomial of x5+x2+1 may be used for the SSS code, and total 31 codes may be generated through different circular shifts.

In order to improve reception performance, two different PSS-based sequences are defined and scrambled into the SSS. In this case, scrambling may be performed on S1 and S2 using different sequences. Thereafter, an S1-based scrambling code is defined, and then scrambling is performed on S2. In this case, the SSS code is swapped every 5 ms but a PSS-based scrambling code is not swapped. The PSS-based scrambling code is defined based on an m-sequence generated from the generation polynomial of x5+x2+1 by applying six cyclic shift schemes according to PSS indices, and S1-based scrambling code is defined based on an m-sequence generated from a polynomial of x5+x4+x2+x1+1 as eight cyclic shift versions according to S1 indices.

2. Narrowband Internet of Things (NB-IoT)

2.1 NB-IoT Overview

The narrowband (NB) LTE is a system for supporting low complexity and power consumption using a system bandwidth corresponding to one PRB, which is defined in the LTE system. As a communication scheme, the NB LTE can be used to implement IoT by supporting devices in a cellular system like machine-type communication (MTC). That is, the NB LTE system can be referred to as an NB-IoT system.

Since the NB-IoT system use the same OFDM parameters including subcarrier spacing as in the LTE system, one PRB in the legacy LTE band is allocated for the NB-LTE without additional allocation of bands. That is, the NB-IoT system has advantages in that frequencies can be efficiently used.

In the NB-LTE system, physical downlink channels are defined as an M-PSS/M-SSS, an M-PBCH, an M-PDCCH/M-EPDCCH, an M-PDSCH, etc. or an NB-PSS/NB-SSS, an NB-PBCH, an NB-PDCCH/NB-EPDDCH, an NB-PDSCH, etc. To distinguish the physical downlink channels of the NB-LTE system from physical channels of the LTE system, 'M-' or 'NB-' can be added.

Embodiments of the present disclosure as described below relate to a PSS and an SSS which are applied to an NB-IoT system. Therefore, although NPSS, MPSS or NB-PSS is written shortly as PSS, the terms are interchangeably used in the same meaning. In addition, although NSSS, MSSS or NB-SSS is written shortly as SSS, the terms are interchangeably used in the same meaning.

Further, in embodiments of the present disclosure, one PRB includes a pair of RBs, for which the description of FIGS. 2 and 3 may be referred to. For example, one RB may include 7 OFDM symbols by 12 subcarriers.

2.2 Golay Sequence

Golay complementary sequences are pairs of binary codes belonging to signals called complementary pairs, which include two codes of the same length n. The Golay sequences have auto-correlation functions with side-lobes equal in magnitude but opposite in sign. Summing the auto-correlation functions up results in a composite auto-correlation function with a peak of 2n and zero side-lobes.

There are several different algorithms for generating Golay pairs. For example, DOKOVIC described a method of calculating Golay sequences. Variables $a_i$ and $b_i$ (i=1, 2, . . . , n) are the elements of two n-long complementary sets, which are equal to either +1 or −1. Herein, A=$a_1$, $a_2$, . . . , $a_n$, and B=$b_1$, $b_2$, . . . , $b_n$.

The ordered pair (A;B) are Golay sequences of length n if the following [Equation 8] is satisfied, and satisfy the following [Equation 9] in the Laurent polynomial ring $Z[x, x^{-1}]$.

$$A(x)=a_1+a_2x+\ldots+a_nx^{n-1}$$

$$B(x)=b_1+b_2x+\ldots+b_nx^{n-1} \quad \text{[Equation 8]}$$

$$A(x)A(x^{-1})+B(x)B(x^{-1})=2n \quad \text{[Equation 9]}$$

The auto-correlation functions NA and NB corresponding to the sequences A and B respectively are defined by the following expressions.

$$N_A(j) = \sum_{i \in Z} a_i a_{i+j} \quad \text{[Equation 10]}$$

$$N_B(j) = \sum_{i \in Z} b_i b_{i+j}$$

Herein, if k (1, ..., n), $a_k$=0. [Equation 9] may be replaced with the sum of $N_A$ and $N_B$, which may be expressed as the following [Equation 11].

$$N_A(j) + N_B(j) = \begin{cases} 2N, & j=0 \\ 0, & j \neq 0 \end{cases} \quad \text{[Equation 11]}$$

In [Equation 11], the sum of both autocorrelation functions is 2N at j=0 and zero otherwise.

Budision described the recursive method for constructing Golay sequences, presented below.

$$a_0(i)=\delta(i),$$

$$b_0(i)=\delta(i)$$

$$a_n(i)=a_{n-1}(i)+b_{n-1}(i-2^{n-1}),$$

$$b_n(i)=a_{n-1}(i)+b_{n-1}(i-2^{n-1}) \quad \text{[Equation 12]}$$

In [Equation 12], variables a(i) and b(i) may be the elements of two complementary sequences with elements 1 and −1 of length $2^n$\, where i=0, 1, ..., $2^n$−1. In addition, δ(i) is a Kronecker delta function. [Equation 12] describes generation of new elements of the sequences in each step by concatenating elements $a_n(i)$ and $b_n(i)$ of length n.

3. Method for Generating PSS in NB-IoT System

Figure 14:
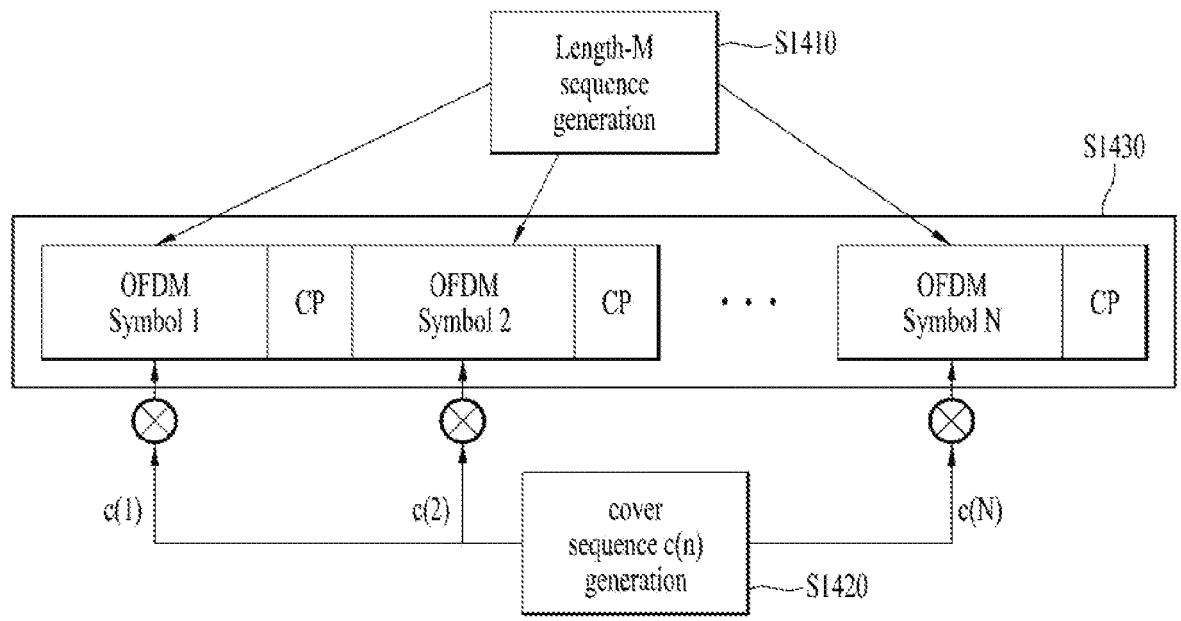
FIG. 14 is a view illustrating a method for transmitting a primary synchronization signal (PSS) in a specific subframe in a narrowband Internet of things (NB-IoT) system.

FIG. 14 is a view illustrating a method for transmitting a PSS in a specific subframe in $a_n$ NB-IoT system.

In the NB-IoT system, a BS transmits a PSS in a plurality of OFDM symbols. Herein, a sequence transmitted in the OFDM symbols may be configured so that the same sequence is repeatedly transmitted in the OFDM symbols (S1410), and each OFDM symbol is multiplied by a specific cover sequence (S1420).

That is, the BS generates a plurality of PSSs by using the same sequence (e.g., a Golay sequence or ZC sequence) in order to transmit the PSSs in the plurality of OFDM symbols. Then, the BS may transmit the generated same PSSs in the plurality of OFDM symbols (S1430).

On the assumption of a bandwidth of one PRB and a subcarrier spacing of 15 KHz in the NB-IoT system, the maximum length of a sequence transmittable in one OFDM symbol is 12. For the convenience of description, the following description is given with the appreciation that the system bandwidth is one PRB, and the subcarrier spacing is 15 KHz.

Typically, a receiver (i.e., a UE) is configured to process a PSS in the time domain in consideration of computation complexity involved in detection. To acquire time/frequency synchronization by the PSS, the UE correlates a PSS sequence by applying a sliding window.

Figure 15:
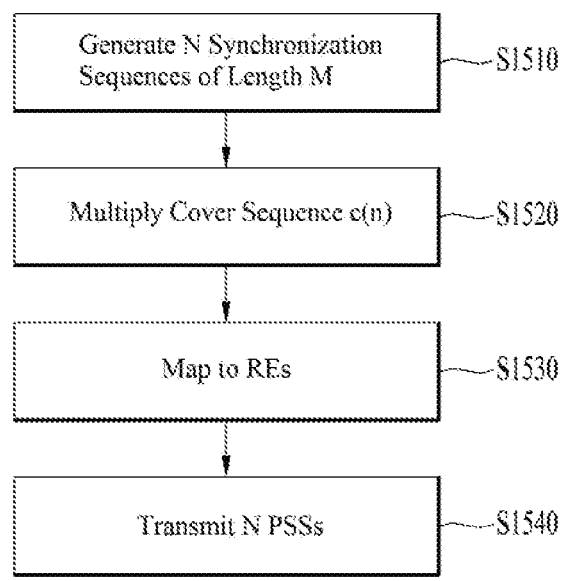
FIG. 15 is a view illustrating a method for generating a PSS in the NB-IoT system.

FIG. 15 is a view illustrating a method for generating a PSS in the NB-IoT system.

With reference to FIG. 14, the method for generating a PSS will be described again in FIG. 15.

The BS generates a first sequence of length M. In order to transmit a PSS in N OFDM symbols included in one subframe, the BS repeats the first sequence of length M N times. Or the BS may repeatedly use a system-preset first sequence N times (S1510).

To generate a PSS sequence, the BS may multiply the N first sequences by a cover sequence c(n) of a length equal to the length of OFDM symbols carrying PSSs. Herein, each time the BS generates a PSS sequence, the BS may generate the cover sequence c(n) or use a system-preset cover sequence c(n). The cover sequence may be referred to as a second sequence. The reason for multiplying the cover sequence is to facilitate detection of a peak value for a PSS, when the UE detects the PSS.

In FIG. 14, the first sequence of length M is mapped to the subcarriers of one OFDM symbol in one RB. The BS fills '0' in subcarriers (i.e., REs) to which the first sequence is not allocated in a specific OFDM symbol carrying a PSS. In addition, the N OFDM symbols may be OFDM symbols except for a control region in one subframe. For example, if the control region of one subframe is 3 OFDM symbols, N may be set to 11.

The BS may map the generated PSS sequences to REs. Herein, the BS may map the same N PSS sequences in the OFDM symbols except for the control region of the subframe (S1530).

The BS may transmit N PSSs in the fifth subframe of every radio frame (S1540).

In the PSS transmission structure of FIG. 14, the same sequence is transmitted in each OFDM symbol, and thus a relatively large correlation value may result with a periodicity of an OFDM symbol length. Herein, if the condition of [Equation 11] for Golay complementary sequences is used, the output period of a relatively large correlation value may be increased, thereby improving correlation characteristics. The BS may further improve the correlation characteristics by applying a cover sequence to each OFDM symbol in order to generate a PSS. Methods for transmitting a PSS by using Golay complementary sequences as first sequences are given as follows.

3.1 First Method for Generating PSS

The first method for generating a PSS is to arrange a pair of Golay complementary sequences alternately in respective OFDM symbols. For example, if the number of OFDM symbols carrying PSSs is 6 (N=6), the BS may transmit a(n) in OFDM symbol #1, and b(n) in OFDM symbol #2. Herein, c(n) may be applied by taking a length of 6 from an m-sequence of length 7.

In addition, it is preferred that the number of OFDM symbols carrying PSSs is an even number. If it is assumed that Golay complementary sequences are binary sequences, the possible lengths of the sequences may be $2^a$, $10^b$, $26^c$, and/or $2^a*10^b*26^a$ (a, b and c are 0 or larger integers). If only 12 resources are available in one OFDM symbol, the possible length for the Golay sequences may be 10. In an embodiment of a Golay complementary sequence pair [a(n), b(n)], a(n)=[1 1 -1 -1 1 1 1 1 -1 1 -1 1 1 -1 1] and b(n)=[1 1 1 1 1 -1 1 -1 1 1]. The BS may transmit the OFDM symbols with '0' filled in the REs of subcarriers to which a PSS sequence is not allocated.

If non-binary Golay complementary sequences are assumed, a sequence pair may exist without a length limit in generating PSSs. Therefore, the BS may arrange a sequence pair of length 12, a(n) and b(n) in OFDM symbols in the same manner. Correlation characteristics for a complementary sequence pair of length n, a(n) and b(n), and various c(n) patterns are illustrated in FIG. 16.

Figure 16:
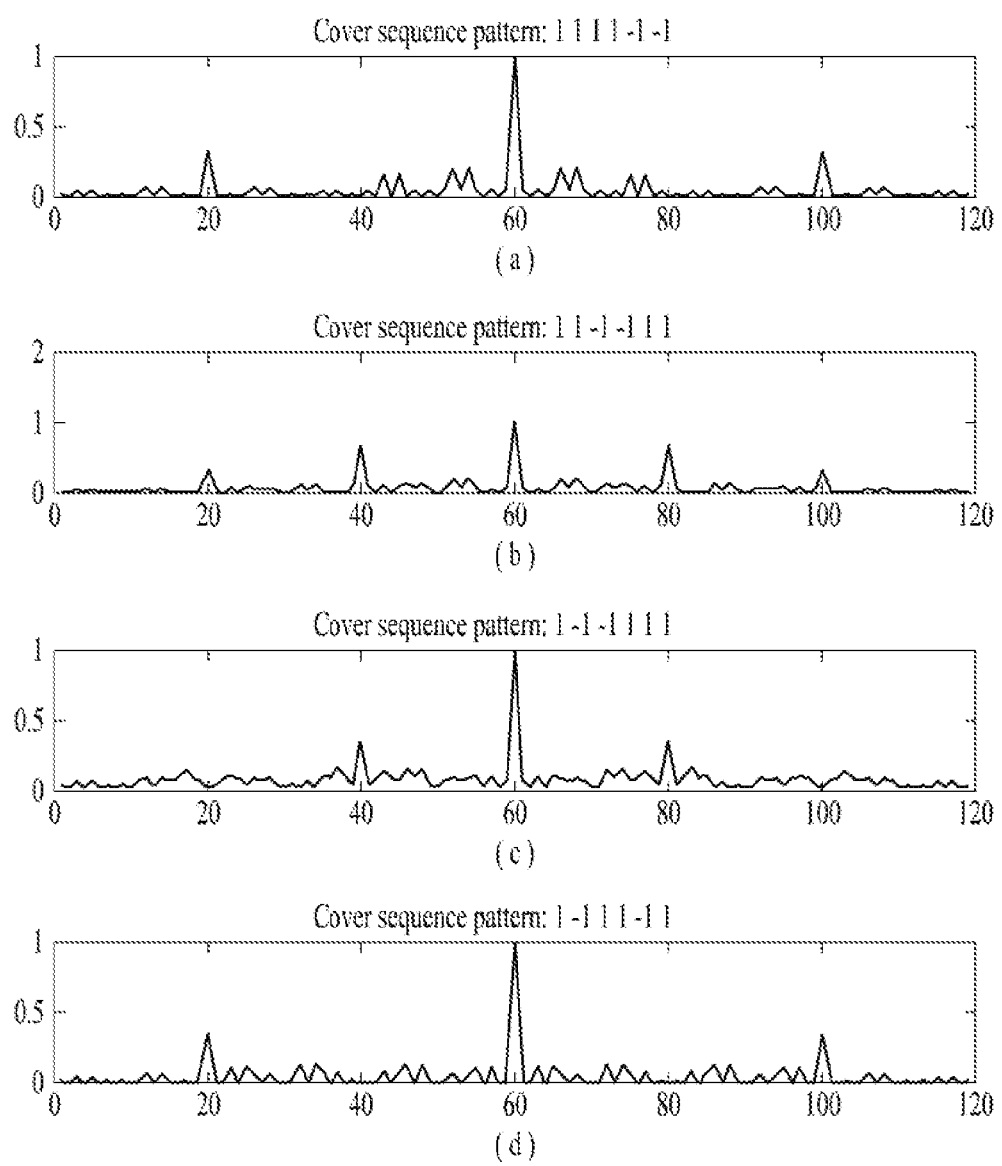
FIG. 16 is a view illustrating correlation characteristics according to cover code patterns required for generating a PSS.

FIG. 16 is a view illustrating correlation characteristics according to cover code patterns required for generating a PSS.

FIG. 16 illustrates correlation characteristics according to a complementary sequence pair a(n)=[11-1-1111-11-1] and b(n)=[11111-11-1-11], and various cover code patterns. That is, FIG. 16(a) illustrates a case where the cover sequence pattern is [1111-1-1], FIG. 16(b) illustrates a case where the cover sequence pattern is [11-1-111], FIG. 16(c) illustrates a case where the cover sequence pattern is [1-1-1111], and FIG. 16(d) illustrates a case where the cover sequence pattern is [1-111-11].

In FIG. 16, it is assumed that the length of a cover sequence is 6. This implies that a synchronization sequence used to generate PSSs is repeatedly generated 6 times. If a synchronization sequence is generated repeatedly N times, the length of a cover sequence may also be set to N.

In another aspect of the first method, if the BS transmits PSSs in an odd number of OFDM symbols, the PSSs may be transmitted by transmitting one sequence in a sequence pair once more. For example, if N=7, the BS may arrange Golay sequences in the order of a(n)b(n)a(n)b(n)a(n)b(n)a(n) in the OFDM symbols.

3.2 Second Method for Generating PSS

The BS may generate PSSs by arranging a pair of Golay complementary sequences in one OFDM symbol.

In one method, the BS may generate sequences corresponding to the halves of one OFDM symbol, and arrange the sequences in the OFDM symbol. For example, it may be assumed that a PSS is transmitted repeatedly in six OFDM symbols (N=6). Herein, the BS may generate non-binary Golay complementary sequences of length 6, a(n) and b(n), allocate a(n) to one half of the available REs of one OFDM symbol, and allocate b(n) to the other half of the available REs of the OFDM symbol. Herein, as a method for allocating a synchronization sequence to REs, the BS may allocate a(n) to the former half of REs of an OFDM symbol and b(n) to the latter half of the REs.

In another method, the BS may superpose a(n) and b(n) in one OFDM symbol. For example, if a PSS is transmitted repeatedly in 6 OFDM symbols (N=6), the BS may generate binary/non-binary Golay complementary sequences of length 10 or 12, and calculate a(n)+b(n), for transmission.

3.3 Third Method for Generating PSS

The BS may arrange and transmit L (L>2) or more Golay complementary sequences. Preferably, the number of OFDM symbols carrying PSSs satisfies the condition of a multiple of L. For example, if L=3 and N=6, the BS may sequentially arrange and transmit Golay complementary sequences of length 10 or 12, la(n), lb(n), and lc(n) in OFDM symbols. That is, the BS may arrange the first sequences in the order of la(n), lb(n), lc(n), la(n), lb(n), and lc(n) to generate PSSs, apply a cover sequence c(n) to the first sequences, and transmit the PSSs.

3.4 Method for Generating PSS by ZC Sequence

In the afore-described Sections 3.1 to 3.3, a Golay sequence is used as a first sequence in order to generate a PSS. Now, a description will be given of methods for using a ZC sequence as a first sequence.

The BS may use a ZC sequence of length 11 to generate a PSS. The ZC sequence of length 11 may be defined as the following [Equation 13].

$$Z(k) = \exp\left(\frac{-ju\pi k(k+1)}{11}\right), \quad \text{[Equation 13]}$$

$$u = 1, 2, \ldots, 10, k = 0, 1, \ldots, 10$$

In [Equation 13], u is a root index for the ZC sequence. The BS may select two ZC sequences $Z_1(k)$ and $Z_2(k)$ having different root indexes, and map the selected ZC sequences to OFDM symbols. In addition, the BS may apply a cover code (or cover sequence) c(k) to each of the OFDM symbols.

On the assumption that the number of OFDM symbols carrying PSSs is 11, the BS may arrange $Z_1(k)$ and $Z_2(k)$ in the OFDM symbols in the following methods. In the following methods, as the number of OFDM symbols in which one sequence is arranged contiguously is smaller, PSS detection performance may be improved, and as the number of OFDM symbols in which one sequence is arranged contiguously is larger, the computation volume of a UE may be reduced in a specific detection method. Accordingly, the number of OFDM symbols carrying PSSs may be in a trade-off relationship.

3.4.1 Method 1

The BS may arrange one ZC sequence (e.g., Z1(k)) successively in two OFDM symbols, and the other ZC sequence (e.g., Z2(k)) in the following two OFDM symbols. For example, the BS may arrange the ZC sequences in the order of [Z1(k)Z1(k)Z2(k)Z2(k)Z1(k)Z1(k)Z2(k)Z2(k)Z1(k)Z1(k)Z2(k)] in OFDM symbols.

3.4.2 Method 2

The BS may arrange one ZC sequence (e.g., Z1(k)) successively in three OFDM symbols and the other ZC sequence (e.g., Z2(k)) in the following three OFDM symbols. For example, the BS may arrange the ZC sequences in the order of [Z1(k)Z1(k)Z1(k)Z2(k)Z2(k)Z2(k)Z1(k)Z1(k)Z1(k)Z2(k)Z2(k)] in OFDM symbols.

3.4.3 Method 3

The BS may arrange one ZC sequence (e.g., Z1(k)) successively in four OFDM symbols, and the other ZC sequence (e.g., Z2(k)) in the following four OFDM symbols. For example, the BS may arrange the ZC sequences in the order of [Z1(k)Z1(k)Z1(k)Z1(k)Z2(k)Z2(k)Z2(k)Z2(k)Z1(k)Z1(k)Z1(k)] in OFDM symbols.

3.4.4 Method 4

The BS may arrange one ZC sequence (e.g., Z1(k)) successively in five OFDM symbols, and the other ZC sequence (e.g., Z2(k)) in the following five OFDM symbols. For example, the BS may arrange the ZC sequences in the order of [Z1(k)Z1(k)Z1(k)Z1(k)Z1(k)Z2(k)Z2(k)Z2(k)Z2(k)Z2(k)Z1(k)] in OFDM symbols.

3.4.5 Method 5

The BS may arrange one ZC sequence (e.g., Z1(k)) successively in six OFDM symbols, and the other ZC sequence (e.g., Z2(k)) in the following six OFDM symbols. For example, the BS may arrange the ZC sequences in the order of [Z1(k)Z1(k)Z1(k)Z1(k)Z1(k)Z1(k)Z2(k)Z2(k)Z2(k)Z2(k)Z2(k)] in OFDM symbols.

3.5 Cover Sequence

A cover sequence or cover code c(k) may contribute much to improvement of the correlation characteristics of a PSS sequence. That is, the UE detects a peak value by correlation to receive a PSS signal, and the cover sequence may facilitate detection of the peak value. The following [Equation 14] represents $a_n$ exemplary set of cover sequences.

$$c(k)=\{[1,1,1,1,-1,1,-1,1,1,-1,1],$$

$$[1,1,1,-1,-1,-1,-1,-1,1,-1,1],$$

$$[1,-1,1,1,-1,1,-1,1,1,1,1],$$

$$[1,-1,1,-1,-1,-1,-1,-1,1,1,1],$$

or $$[1,-1,1,1,1,1,1,1,-1,-1,-1]\} \qquad \text{[Equation 14]}$$

In [Equation 14], c(k) represents code covers or cover sequences which are optimal in terms of a minimum power sum of a second peak value and a side-lobe, when the BS selects two of the ZC sequences of [Equation 13] and configure the selected ZC sequences as illustrated in FIG. 14. Herein, it is assumed that the root indexes of the ZC sequences are 5 and/or 6, and the ZC sequences are alternately transmitted in OFDM symbols.

Cover codes obtained by exchanging the signs +/− in the set of cover sequences c(k) in [Equation 14] also have the same performance.

In the foregoing embodiments and later-described embodiments of the present disclosure, an M sequence or a sequence of length M may be a ZC sequence, a Golay sequence, or the like. That is, unless specified otherwise, an M sequence or a sequence of length M may mean a ZC sequence, a Golay sequence, or the like.

4. Methods for Generating SSS in NB-IoT System

Methods for generating an SSS in the NB-IoT system will be described below.

A UE may acquire time and frequency synchronization based on a received PSS, and detect a cell ID, the index of a subframe carrying an SSS, and other system information by detecting an SSS.

Figure 17:
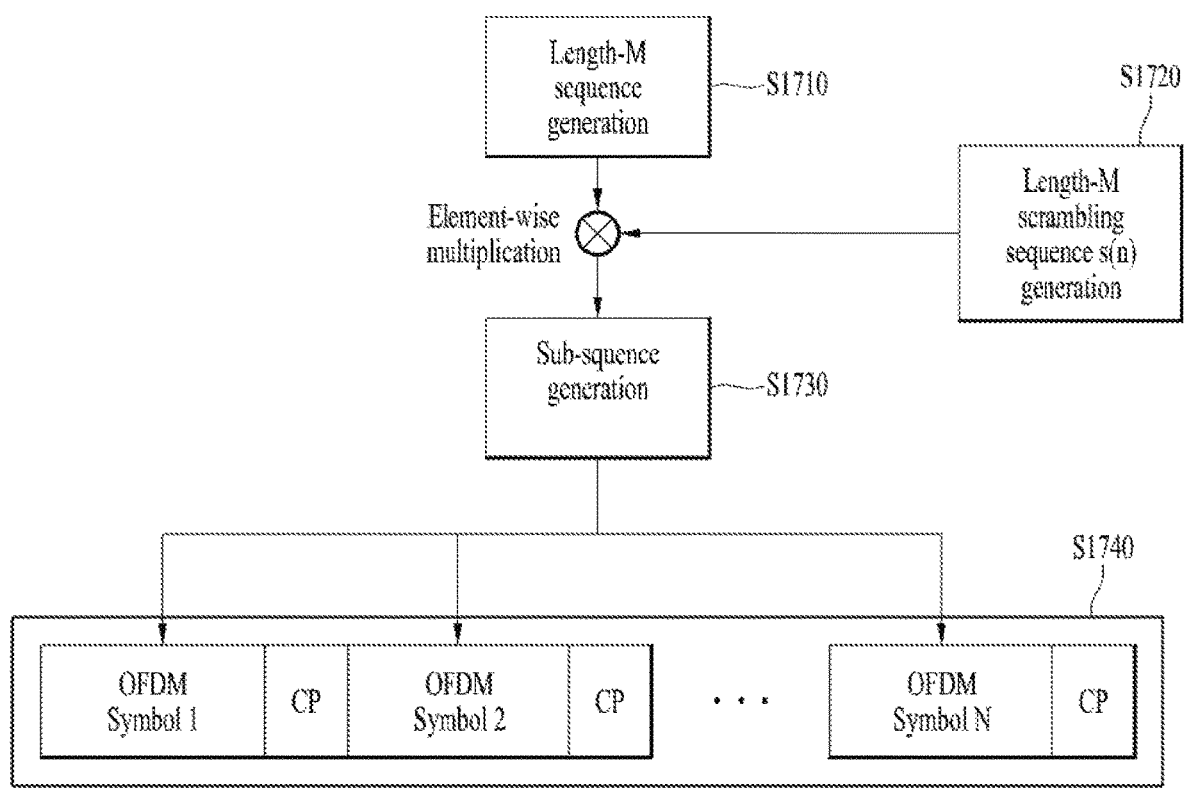
FIG. 17 is a view illustrating a method for transmitting an SSS in a specific subframe in the NB-IoT system.

FIG. 17 is a view illustrating a method for transmitting an SSS in a specific subframe in the NB-IoT system.

An SSS transmission structure may be configured as illustrated in FIG. 17. To generate an SSS sequence, the BS may generate a sequence of length M (or a first sequence) (S1710). In addition, to generate the SSS sequence, the BS may generate a scrambling sequence of length M (or a second sequence) s(n) (S1720).

The BS may generate a sub-sequence (or a third sequence) by multiplying the first sequence by the second sequence (S1730).

In step S1730, the first sequence and the second sequence may be multiplied element-wise. For example, if there are a set of first sequences and a set of second sequences, a sub-sequence may be generated by multiplying the elements of the respective sets.

Subsequently, the BS may map the generated sub-sequence in OFDM symbols of a subframe, in which SSSs are transmitted (S1740).

Or, to transmit an SSS sequence in N OFDM symbols, the BS may divide the first sequence into sequences of length L (M>=L), arrange the sequences of length L in the respective N OFDM symbols, and generate SSSs by applying the scrambling sequence s(n) to the divided first sequences. For example, if M=72, L=12, and N=6, the BS may divide a first sequence of length 72 into six sequences of length 12, and transmit the six sequences respectively in six OFDM symbols.

Figure 18:
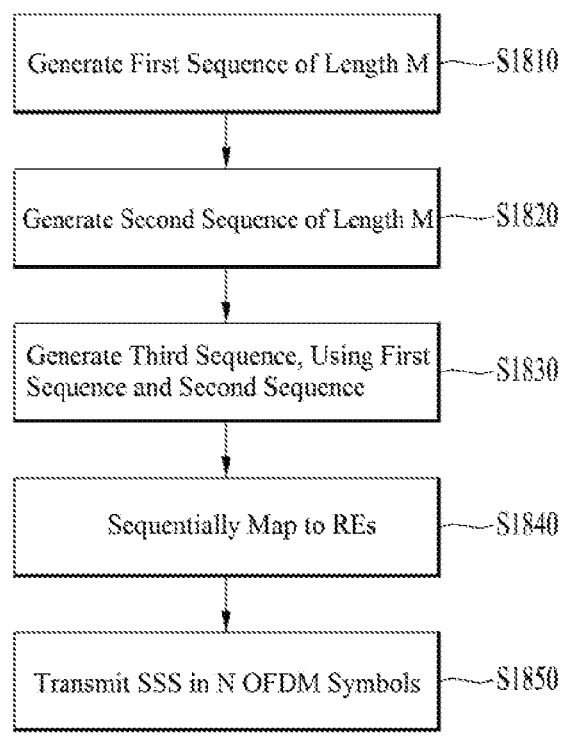
FIG. 18 is a view illustrating a method for generating an SSS in a specific subframe in the NB-IoT system.

FIG. 18 is a view illustrating a method for generating an SSS in a specific subframe in the NB-IoT system.

In order to generate an SSS sequence, the BS generates a first sequence of length M and a second sequence of length M (S1810 and S1820).

In embodiments of the present disclosure, a ZC sequence may be used as the first sequence, and a scrambling sequence or a Hadamard sequence may be used as the second sequence. The UE may derive a physical cell ID (PCI) and subframe position information from information included in the received first and second sequences.

The BS may generate a third sequence by using the first and second sequences. The third sequence may be referred to as an SSS sequence or a sub-sequence (S1830).

The BS may generate SSSs based on the third sequence. That is, the BS may generate SSSs by allocating and mapping the third sequence to REs of N OFDM symbols in a specific subframe (SF) (S1840).

The BS may transmit the SSSs in the N OFDM symbols (S1840).

Now, a description will be given of methods for designing and generating an SSS in the NB-IoT system, which are applicable to FIGS. 17 and 18.

4.1 First Method for Generating SSS

The BS generates two ZC sequences of length M/2 (i.e., first sequences) (e.g., SSS1 and SSS2), and then generates a first sequence of length M by concatenating the two ZC sequences. The root indexes of the ZC sequences may be fixed to a specific value. For example, root index u may be fixed to '1'.

The BS may represent information about a cell ID by a combination of cyclic shift values (CS1 and CS2) for the generated two first sequences. Then, the BS may generate a scrambling sequence of length M (i.e., a second sequence) by a function of information about a subframe carrying SSSs and system information. Subsequently, the BS may divide the first sequence into N sequences of length L, and allocate the N sequences to N OFDM symbols.

For example, if M=72, L=12, and N=6, the BS generates two ZC sequences, using cyclic shift values representing a cell ID, and concatenates the ZC sequences. That is, to transmit a PN sequence of length 128 based on a scrambling sequence of length c in six OFDM symbols, the BS may divide the concatenated ZC sequence into sequences of length 12, and allocate the sequences of length 12 to the respective OFDM symbols.

The scrambling sequence may be expressed as [Equation 15].

$$c_{init}=N_{sys}2^4+N_{index}^{subframe} \qquad \text{[Equation 15]}$$

The BS may generate a scrambling sequence of length 72 by applying a predetermined offset to an m sequence of length 127 generated through initialization to system information ($N_{sys}2^4$), subframe information ($N_{index}^{subframe}$), and so one, as described in [Equation 15]. Subsequently, the BS may multiply the generated scrambling sequence by the concatenated ZC sequence.

In another method, the BS may generate an offset value for an m sequence of length 127, which has been generated by initializing the scrambling sequence to any value (e.g., $c_{init}=1$), by means of a function of subframe information, system information, and so on, and then generate a scrambling sequence of length 72 based on the offset value.

If the offset value is larger than 5:5, the scrambling sequence is generated by counting to a beginning sequence in a cyclic shift manner. For example, the scrambling sequence may be generated in the manner of s(k), . . . , s(127), s(1), . . . .

4.2 Second Method for Generating SSS

The BS generates a first sequence of length M by generating two Golay complementary sequences of length M/2 (e.g., SSS1 and SSS2) and then concatenating the Golay complementary sequences. Herein, the BS may use one Golay sequence of the Golay complementary sequence pair as SSS1 or SSS2, or allocate one of the Golay complementary sequences as SSS1 and the other Golay complementary sequence as SSS2.

The BS may represent information about a physical cell ID by a combination of cyclic shift values (CS1 and CS2) for the generated two sequences. Then, the BS may generate a scrambling sequence of length M by a function of information about a subframe carrying SSSs and system information. Subsequently, the BS may divide the sequence of length L by the number of OFDM symbols, N, and allocate the divided sequences to N respective OFDM symbols. The BS may allocate '0' instead of an SSS sequence to a part of REs of the OFDM symbols in view of a limitation on the length of the Golay complementary sequence pair according to a combination of M, L and N.

4.3 Third Method for Generating SSS

Figure 19:
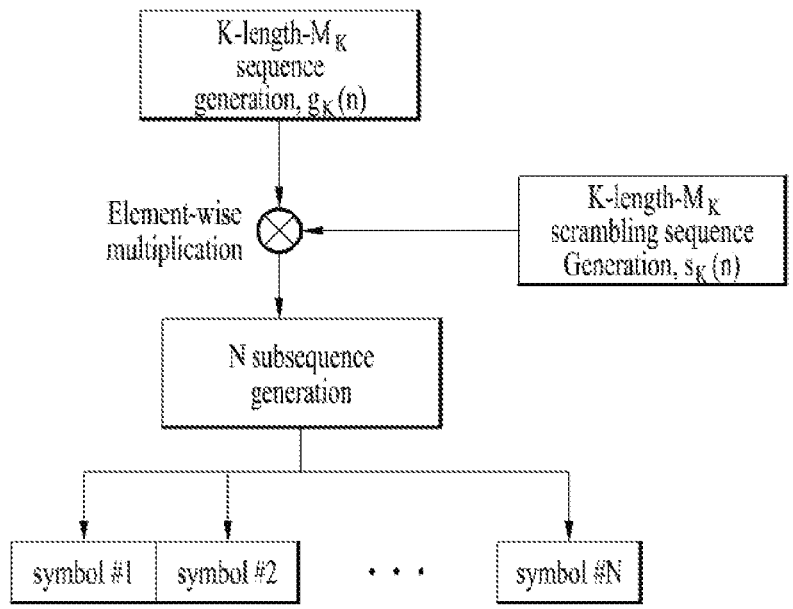
FIG. 19 is a view illustrating another method for transmitting an SSS in a specific subframe in the NB-IoT system.

In another method for transmitting an SSS, the BS may consider the transmission structure in FIG. 19.

FIG. 19 is a view illustrating another method for transmitting an SSS in a specific subframe in the NB-IoT system.

Referring to FIG. 19, the BS generates K first sequences of length $M_k$ and K second sequences (or scrambling sequences) of length $M_k$. The lengths of the first sequences $g_k(n)$ and the second sequences $s_k(n)$ generated by the BS may be set to be equal. The BS may generate sub-sequences (or third sequences) by multiplying $g_k(n)$ by $s_k(n)$ element-wise, for transmission in OFDM symbols. Herein, the BS may insert '0s' in remaining RE areas, when the sub-sequences are generated according to the amount of data transmittable in each OFDM symbol.

If the amount of data transmittable in each OFDM symbol is 'R', the length of a sequence transmittable in 'N' OFDM symbols is N*R, satisfying the relationship that N*R>=K*$M_k$. Therefore, the number of OFDM symbols carrying SSSs, N and an information transfer method may vary according to k, $g_k(n)$, and/or $s_k(n)$.

In embodiments of the present disclosure, it is assumed that SSSs carry 504 PCIs and information about the positions of eight subframes in which SSSs are transmitted. Therefore, the BS preferably designs an SSS sequence so that a total of 4032 different hypotheses may be distinguished. In addition, if $M_k$ is different, the sequences have different lengths, and thus correlation performance may be different during reception at a UE. Therefore, since the correlation performance is determined by a smallest $M_k$ value, it is preferred that the sequences have the same length $M_k$.

4.3.1 K=2

On the assumption that the BS generates two sequences of the same length, sequences of length 64 are needed (64*64=4096>4032) in order to allow a UE to distinguish 4032 hypotheses by receiving an SSS. The sequences of length 64, $g_k(n)$ (k=1, 2) may be selected from sequences proposed in the following options.

Option 1) Walsh-Hadamard Sequences of Length 64

$H_{64}^u$ may represent a $u^{th}$ column or row (u=1, . . . , 64) of a 64×64 Walsh-Hadamard matrix.

Option 2) Golay Complementary Sequences of Length 64

If sequences of length L, $a_n$ and $b_n$ satisfy the property of a Golay complementary sequence pair, sequences of length 2L, $a_n'=[a_n\ b_n]$ and $b_n'=[a_n\ -b_n]$ also satisfy the property of a Golay complementary sequence pair. Therefore, since $a_1$=[1 1] and $b_1$[1 -1] satisfy the complementary property, the BS may generate a pair of Golay sequences of length 64, using $a_1$ and $b_1$ in a recursive manner such as the method for generating an SSS sequence of length 2L. If the BS generates 32 different Golay sequence pairs, the BS may generate a 64×64 matrix. $G_{64}^u$ represents a $u^{th}$ column or row (u=1, . . . , 64) of such a 64×64 matrix.

Option 3) Sequences of Length 64 Each Obtained by Adding '0' at any Position of an m-Sequence of Length 63

The BS may generate a 64×64 matrix with 64 sequences of length 64 generated by 64 cyclic shifts. $M_{64}^u$ represents a $u^{th}$ column or row (u=1, . . . , 64) of such a 64×64 matrix.

Option 4) ZC Sequences of Length 67

The BS may generate a 64×67 matrix with 64 sequences of length 67 generated based on 64 root indexes for a ZC sequence of length 67. Or, the BS may generate a 64×66 or 64×64 matrix with sequences of length 66 or 64 by puncturing sequences of length 67. Herein $Z_{67}^u/Z_{66}^u/Z_{64}^u$ represent a sequence of length 67/66/64 generated based on root index u.

Therefore, a PCI and subframe position information may be transmitted by a combination of a $u^{th}$ column or row and a $v^{th}$ column or row of a 64×64 matrix as proposed in the above options. For example, a combination of (u, v) (u, v=1, 2, . . . , 64) may carry a PCI and subframe position information.

4.3.2 Method for Generating SSS Sequence for K=2

Since the scrambling sequence (i.e., the second sequence) $s_k(n)$ has the same length as the first sequence $g_k(n)$, the scrambling sequence is a sequence of length 64. Therefore, the BS may design a modified m-sequence generated in the method of option 3) as the first sequence $g_k(n)$. If the first sequence $g_k(n)$ is a modified m-sequence as in option 3), the scrambling sequence $s_k(n)$ is preferably generated by a different generator polynomial from that of $g_k(n)$.

Since it is preferred to design the scrambling sequence $s_k(n)$ in a manner that reduces interference from an SSS transmitted from a neighbor cell, the BS may generate a different sequence by defining a cyclic shift value according to a PCI. Hereinbelow, methods for generating an SSS sequence by a BS will be described.

4.3.2.1 Method 1

The BS may generate an SSS sequence in the form of [g1(n)*s1(n)g2(n)*s2(n)]. Because the scrambling sequence $s_k(n)$ is PCI-based, a receiver needs 504*2 correlation operations to acquire a PCI and subframe position information.

4.3.2.2 Method 2

The BS may generate an SSS sequence in the form of [g1(n)*s1(n)g2(n)*s1(n)]. Because the scrambling sequence $s_k(n)$ is PCI-based, a receiver (i.e., a UE) needs 504*2 correlation operations to acquire a PCI and subframe position information.

4.3.2.3 Method 3

The BS may generate an SSS sequence in the form of [g1(n)g2(n)*s1(n)]. Because the scrambling sequence $s_k(n)$ is determined by a PCI and affects only g2(n), a receiver needs 64+504 correlation operations.

The length of an SSS sequence generated in the above methods is 128(=64*2). Accordingly, at least 11 OFDM symbols (N=11) are required to transmit the SSS sequence. To divide the SSS sequence on an OFDM symbol basis, the BS may transmit a beginning sequence of length 64 in first six OFDM symbols, and the following sequence of length 64 in the following six OFDM symbols.

[Table 11], [Table 12], and [Table 13] are given to describe u and v values according to PCIs and subframe positions, and cyclic shift values p1 and p2 for a scrambling sequence in relation to the SSS sequence generation methods.

[Table 11] illustrates u and v values according to PCIs and subframe positions, and cyclic shift values p1 and p2 for a scrambling sequence in the first method for generating an SSS, described in Section 4.3.2.1.

TABLE 11

| PCI | SF position | u | v | p1 | p2 | PCI | SF position | u | v | p1 | p2 |
|---|---|---|---|---|---|---|---|---|---|---|---|
| 0 | 0 | 1 | 1 | 0 | 0 | 1 | 0 | 1 | 9 | 0 | 1 |
| 0 | 1 | 1 | 2 | 0 | 0 | 1 | 1 | 1 | 10 | 0 | 1 |
| 0 | 2 | 1 | 3 | 0 | 0 | 2 | 0 | 1 | 17 | 0 | 2 |
| 0 | 3 | 1 | 4 | 0 | 0 | 2 | 1 | 1 | 18 | 0 | 2 |
| 0 | 4 | 1 | 5 | 0 | 0 | 3 | 0 | 1 | 25 | 0 | 3 |
| 0 | 5 | 1 | 6 | 0 | 0 | 3 | 1 | 1 | 26 | 0 | 3 |
| 0 | 6 | 1 | 7 | 0 | 0 | 4 | 0 | 1 | 33 | 0 | 4 |
| 0 | 7 | 1 | 8 | 0 | 0 | 4 | 1 | 1 | 34 | 0 | 4 |
| ... | ... | ... | ... | ... | ... | ... | ... | ... | ... | ... | ... |

[Table 12] illustrates u and v values according to PCIs and subframe positions, and cyclic shift values p1 and p2 for a scrambling sequence in the second method for generating an SSS, described in Section 4.3.2.2.

TABLE 12

| PCI | SF position | u | v | p1 | PCI | SF position | u | v | p1 |
|---|---|---|---|---|---|---|---|---|---|
| 0 | 0 | 1 | 1 | 0 | 1 | 0 | 1 | 9 | 1 |
| 0 | 1 | 1 | 2 | 0 | 1 | 1 | 1 | 10 | 1 |
| 0 | 2 | 1 | 3 | 0 | 2 | 0 | 1 | 17 | 2 |
| 0 | 3 | 1 | 4 | 0 | 2 | 1 | 1 | 18 | 2 |
| 0 | 4 | 1 | 5 | 0 | 3 | 0 | 1 | 25 | 3 |
| 0 | 5 | 1 | 6 | 0 | 3 | 1 | 1 | 26 | 3 |
| 0 | 6 | 1 | 7 | 0 | 4 | 0 | 1 | 33 | 4 |
| 0 | 7 | 1 | 8 | 0 | 4 | 1 | 1 | 34 | 4 |
| ... | ... | ... | ... | ... | ... | ... | ... | ... | ... |

[Table 13] illustrates u and v values according to PCIs and subframe positions, and cyclic shift values p1 and p2 for a scrambling sequence in the third method for generating an SSS, described in Section 4.3.2.3.

TABLE 13

| PCI | SF position | u | v | p1 | PCI | SF position | u | v | p1 |
|---|---|---|---|---|---|---|---|---|---|
| 0 | 0 | 1 | 1 | 0 | 1 | 0 | 1 | 9 | 1 |
| 0 | 1 | 1 | 2 | 0 | 1 | 1 | 1 | 10 | 1 |
| 0 | 2 | 1 | 3 | 0 | 2 | 0 | 1 | 17 | 2 |
| 0 | 3 | 1 | 4 | 0 | 2 | 1 | 1 | 18 | 2 |
| 0 | 4 | 1 | 5 | 0 | 3 | 0 | 1 | 25 | 3 |
| 0 | 5 | 1 | 6 | 0 | 3 | 1 | 1 | 26 | 3 |
| 0 | 6 | 1 | 7 | 0 | 4 | 0 | 1 | 33 | 4 |
| 0 | 7 | 1 | 8 | 0 | 4 | 1 | 1 | 34 | 4 |
| ... | ... | ... | ... | ... | ... | ... | ... | ... | ... |

4.3.3 Other Methods for Generating SSS Sequence for K=2

Other methods for generating an SSS sequence by a BS will be described below. 9 bits are required to represent 504 PCIs, and 3 bits are required to represent 8 subframe positions. That is, the BS needs a total of 12 bits to generate an SSS sequence, and the 12 bits may be expressed as {p11, p10, p0}. Herein, p11 is a most significant bit (MSB) and p0 is a least significant bit (LSB).

That is, the SSS sequence may be represented as $PCI_b*2^3+SF_b$. Herein, $PCI_b$ is a binary representation of a PCI, and $SF_b$ is a binary representation of a subframe position. An SSS sequence obtained by interleaving {p11, p10, p0} may be represented as {q11, q10, q0}. Herein, an SSS sequence may be generated by using a decimal representation of {q11, q6} as the index of a u value and [q5, q0] as the index of a v value. For example, if {q11, q6} is {1, 0, 0, 1, 1, 0}, 100110₂=42 and thus 42 may be used as the index of u.

It is preferred to design an interleaver such that the bits representing a PCI and subframe position information may affect both u and v indexes. For example, a PCI is 9 bits, thus affecting both u and v indexes, and the interleaver is preferably designed so that all of bits {p2, p1, p0} representing a subframe position may not be mapped to {q11, ..., 16} or {q5, ..., q0}.

[Table 14] illustrates an exemplary interleaver for mapping u and v indexes according to a PCI and a subframe position.

TABLE 14

| Original sequence | p11 | p10 | p9 | p8 | p7 | p6 | p5 | p4 | p3 | p2 | p1 | p0 |
|---|---|---|---|---|---|---|---|---|---|---|---|---|
| Interleaved sequence | q11 | q10 | q9 | q8 | q7 | q0 | q5 | q4 | q3 | q2 | q1 | q6 |

The SSS sequence generated in this manner has a length of 128(=64*2). Therefore, the BS needs at least 11 OFDM symbols (N=11) to transmit the SSS sequence. To divide the SSS sequence on an OFDM symbol basis, the BS may transmit a beginning sequence of length 64 in first six OFDM symbols, and the following sequence of length 64 in the following six OFDM symbols.

4.3.2 K=3

On the assumption that the BS generates three sequences of the same length, sequences of length 16 are needed (64*64*64=4096>4032) in order to allow a UE to distinguish 4032 hypotheses by receiving an SSS. The sequences of length 16, $g_k(n)$ (k=1, 2, 3) may be selected from sequences proposed in the following options. Or the BS may consider sequences of length 32, $g_k(n)$ (k=1, 2, 3) to improve the correlation performance of a UE.

Option 1) Walsh-Hadamard Sequences of Length 16 or 32
$H_{16}^u/H_{32}^u$ represents a $u^{th}$ column or row (u=1, ..., 16/32) of a 16×16 or 32×32 Walsh-Hadamard matrix.

Option 2) Golay Complementary Sequences of Length 16 or 32

If sequences of length L, $a_n$ and $b_n$ satisfy the property of a Golay complementary sequence pair, sequences of length 2L, $a_n'[a_n \ b_n]$ and $b_n'[a_n, -b_n]$ also satisfy the property of a Golay complementary sequence pair. Therefore, since $a_1$=[1 1] and $b_1$[1 -1] satisfy the complementary property, the BS may generate a pair of Golay sequences of length 16 or 32, using $a_1$ and $b_1$ in a recursive manner such as the method for generating an SSS sequence of length 2L. If the BS generates 32 different Golay sequence pairs, the BS may generate a 64×64 matrix. $G_{16}^u/G_{32}^u$ represents a $u^{th}$ column or row (u=1, ..., 16/32) of such a 16×16 or 32×32 matrix.

Option 3) Sequences of Length 16 or 32 Each Obtained by Adding '0' at any Position of an m-Sequence of Length 15 or 31

The BS may generate a 16×16 or 32×32 matrix with 16 or 32 sequences of length 16 or 32 generated by 16 or 32 cyclic shifts. $M_{16}^u/M_{32}^u$ represents a $u^{th}$ column or row (u=1, ..., 16/32) of such a 16×16 or 32×32 matrix.

Option 4) ZC Sequences

The BS may generate a 16×17 or 30×31 matrix with 16 or 30 second sequences of length 17 or 31 generated based on 16 or 30 root indexes for a ZC sequence of length 17 or 31.

Or, the BS may generate a 16×17 or 16×16 matrix with second sequences of length 16 by puncturing first sequences of length 17. Herein $Z_{17}^u/Z_{16}^u/Z_{31}^u$ represents a sequence of length 17, 16 or 31 generated based on root index u.

Therefore, a PCI and subframe position information may be transmitted by a combination of a $u^{th}$ column or row, a $v^{th}$ column or row, and a $w^{th}$ column or row of a 16×16 or 32×32 matrix as proposed in the above options. That is, the BS may transmit a PCI and subframe position information by an SSS sequence generated by a combination of (u, v, w) (u, v=1, 2, . . . , 16/32).

As in the case where K=2, a scrambling sequence is also determined according to a PCI in the case where K=3, thereby reducing influence from an SSS transmitted from a neighbor cell. Accordingly, as in the case where K=2, (u, v, w, p1, p2, p3) values may be defined as listed in the afore-described [Table 11] to [Table 14] in the case where K=3. Herein, p1, p2 and p3 represent cyclic shift values for the scrambling sequence $s_k(n)$.

Since the total length of an SSS sequence is 48(=16*3) or 96(32*3), the SSS sequence may be transmitted in 5 or 9 OFDM symbols. If the SSS sequence is to be transmitted in 9 OFDM symbols, it is preferred to avoid OFDM symbols carrying CRSs. In the case where all symbols carrying CRSs cannot be avoided, it is preferred to avoid OFDM symbols carrying CRSs in antenna port 2 with priority.

For K=K1 (K1 is an integer larger than 3), the BS may also transmit a PCI and subframe position information by generating an SSS sequence in the same manner as for the afore-described cases where K=2 and 3.

4.4 Fourth Method for Generating SSS

Now, a description will be given of methods for designing an SSS sequence, when the number of hypotheses to be distinguished by SSSs is 504, 1008 or 2016 smaller than 4032.

4.4.1 Method 1

If the number of OFDM symbols that the BS uses to transmit an SSS is set to 11, an SSS sequence length of 132 bits is available. Therefore, the BS may transmit an SSS sequence by concatenating two Hadamard sequences of length 64.

504, 1008 or 2016 pieces of information may be represented by a combination of row or column indexes of a 64×64 Hadamard matrix. Accordingly, the BS may generate an SSS sequence, using two Hadamard sequences corresponding to corresponding column or row indexes.

If a UE is to distinguish 504 hypotheses, the 504 (<32*16=512) hypotheses may be distinguished by selecting 32 row/column indexes and 16 row/column indexes from a Hadamard matrix. In the case of 1008 hypotheses, the hypotheses may be distinguished by selecting 32 row/column indexes and 32 row/column indexes. In the case of 2016 hypotheses, the hypotheses may be distinguished by selecting 64 row/column indexes and 32 row/column indexes. Herein, the BS may multiply the sequence by a scrambling sequence of the same length, and transmit the multiplied sequence, and the scrambling sequence may be obtained by adding 0 to an m-sequence of length 63.

4.4.2 Method 2

If the number of OFDM symbols used to transmit an SSS is 6, a sequence length of 72 bits is available. Therefore, the BS may transmit information by concatenating two Hadamard sequences of length 32.

The BS represents 504 pieces of information by a combination of row or column indexes of a 32×32 Hadamard matrix, and transmits two Hadamard sequences corresponding to corresponding column or row indexes. If a UE is to distinguish 504 hypotheses, the 504 (<32*16=512) hypotheses may be distinguished by selecting 32 row/column indexes and 16 row/column indexes from a Hadamard matrix. Herein, the sequence may be multiplied by a scrambling sequence of the same length, and transmitted, and the scrambling sequence may be obtained by adding 0 to an m-sequence of length 31.

4.4.3 Method 3

If the number of OFDM symbols used to transmit an SSS is 7, a sequence length of 84 bits is available. Therefore, the BS represents 504 or 1008 pieces of information by a combination of row or column indexes of a 40×40 Hadamard matrix, and transmit two Hadamard sequences corresponding to corresponding row or column indexes.

If a UE is to distinguish 504 hypotheses, the BS may distinguish the 504 (<23*23=529) hypotheses by selecting 23 row/column indexes and 23 row/column indexes from a 40×40 Hadamard matrix.

If a UE is to distinguish 1008 hypotheses, the BS may distinguish the 1008 hypotheses (<32*32=1024) by selecting 32 row/column indexes. Herein, the BS may multiply the sequence by a scrambling sequence of the same length, and transmit the multiplied sequence, and the scrambling sequence may be a sequence of length 40 obtained by puncturing 23 bits in an m-sequence of length 63. In this case, the BS may match to 84 bits by 4-bit zero padding.

4.4.4 Method 4

If the BS uses 9 OFDM symbols to transmit an SSS, an SSS sequence length of 108 bits is available. Therefore, the BS represents 504, 1008 or 2016 pieces of information by a combination of row or column indexes of a 52×52 Hadamard matrix, and transmit two Hadamard sequences corresponding to corresponding row or column indexes.

If a UE is to distinguish 504 hypotheses, the BS may distinguish the 504 (<23*23=529) hypotheses by selecting 23 row/column indexes and 23 row/column indexes from a 40×40 Hadamard matrix.

If a UE is to distinguish 1008 hypotheses, the BS may distinguish the 1008 hypotheses (<32*32=1024) by selecting 32 row/column indexes. Herein, the BS may multiply the sequence by a scrambling sequence of the same length, and transmit the multiplied sequence, and the scrambling sequence may be a sequence of length 52 obtained by puncturing 11 bits in an m-sequence of length 63. In this case, the BS may match to 108 bits by 4-bit zero padding.

4.5 Method for Transmitting Subframe Information

To reduce the amount of information transmitted in an SSS by the BS, it may be configured that information about a subframe carrying the SSS is acquired from the SSS.

For example, if the BS transmits an SSS every 20 ms, the position of an SF carrying an SSS in the former 20 ms of 40 ms and the position of a SF carrying an SSS in the latter 20 ms of 40 ms may be set to be different or different sequences may be used for the SSSs, on the assumption of an equivalent SSS transmitted every 40 ms. Therefore, if a receiver acquires information by blind detection, only information about the position of 40 ms has only to be transmitted as information to be transmitted in an SSS. The resulting decreased amount of information to be transmitted in an SSS may advantageously lead to transmission of SSS information in a shorter SSS sequence.

If a PSS carries part of PCI information such as a cell group, the number of pieces of PCI information that a UE should acquire from an SSS may be decreased.

For example, if the UE has acquired two pieces of cell group information from a PSS, the UE may detect a PCI by acquiring information from 252 hypotheses from an SSS, along with the information acquired from the PSS. The following specific methods may be considered.

4.5.1 Method 1

The BS may generate an SSS sequence in the form of [g1(n)*c1(n)*s1(n)g2(n)*c2(n)*s2(n)]. Because the scrambling sequence $s_k(n)$ is PCI-based, a receiver needs 252*2 correlation operations to acquire a PCI and SF position information. Herein, $c_k(n)$ (k=1, 2) is a sequence that determines a cyclic shift value in PCI information acquired from a PSS. $c_k(n)$ may be an m-sequence of the same length as $g_k(n)$ and $s_k(n)$.

4.5.2 Method 2

The BS may generate an SSS sequence in the form of [g1(n)*c1(n)*s1(n)g2(n)*c2(n)*s1(n)]. Because the scrambling sequence $s_k(n)$ is PCI-based, a receiver needs 252*2 correlation operations to acquire a PCI and SF position information. Herein, $c_k(n)$ (k=1, 2) is a sequence that determines a cyclic shift value in PCI information acquired from a PSS. $c_k(n)$ may be an m-sequence of the same length as $g_k(n)$ and $s_k(n)$.

4.5.3 Method 3

The BS may generate an SSS sequence in the form of [g1(n)*c1(n)g2(n)*c2(n)*s1(n)]. Because the scrambling sequence $s_k(n)$ is determined according to a PCI and affects only g2(n), a UE needs 64+252 correlation operations. Herein, $c_k(n)$ (k=1, 2) is a sequence that determines a cyclic shift value in PCI information acquired from a PSS. $c_k(n)$ may be an m-sequence of the same length as $g_k(n)$ and $s_k(n)$.

4.6 Method for Generating SSS without Using Scrambling Sequence

Figure 20:
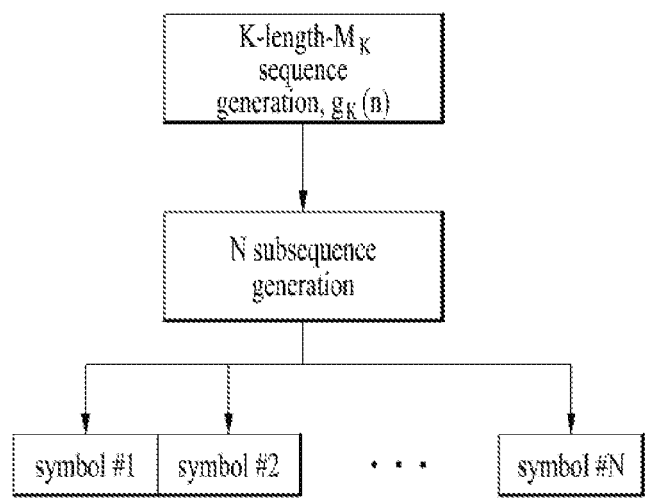
FIG. 20 is a view illustrating a method for generating an SSS without considering a scrambling sequence.

FIG. 20 is a view illustrating a method for generating an SSS without considering a scrambling sequence.

In FIG. 20, the BS generates K sequences of length $M_k$. Herein, the lengths of first sequences $g_k(n)$ generated by the BS may be equal. The BS generates a sub-sequence to transmit $g_k(n)$ in OFDM symbols. Herein, the BS may insert '0' according to the amount of data transmittable in each OFDM symbol during generation of the sub-sequence.

For example, if the amount of data transmittable in each OFDM symbol is R, the length of a sequence transmittable in N OFDM symbols is N*R, satisfying the relationship that N*R>=K*$M_k$. Herein, the number of OFDM symbols carrying an SSS, N and an information transfer method may vary according to K and $g_k(n)$.

For the convenience of description, it is assumed that SSSs carry 504 PCIs and information about the positions of 8 subframes in which SSSs are transmitted. Therefore, the BS preferably designs an SSS sequence so that a total of 4032 different hypotheses may be distinguished. In addition, if $M_k$ is different, the sequences have different lengths, and thus correlation performance may be different during reception at a UE.

That is, since the correlation performance is determined by the smallest $M_k$ value, it is preferred that the sequences have the same length $M_k$. As described before in the foregoing embodiments, $g_k(n)$ may be applied to the case where K=2, 3 or K1 (K1 is an integer larger than 3), and for a PCI and SF position information, the value of a column except for columns corresponding to the cyclic shift values of a scrambling sequence, as defined in [Table 11] to [Table 13] may be applied.

5. Apparatuses

Figure 21:
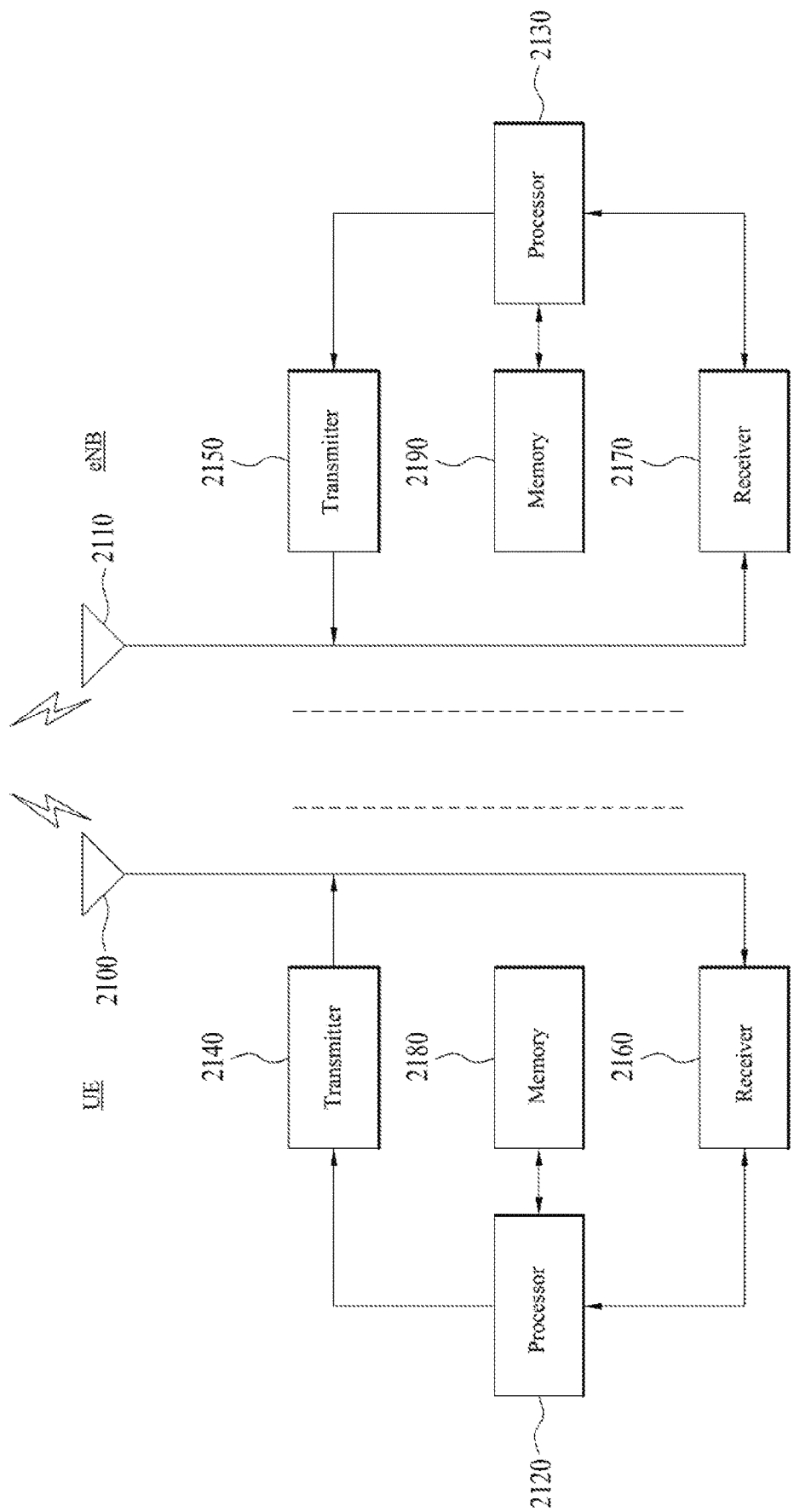
FIG. 21 is a block diagram of apparatuses for implementing the methods described with reference to FIGS. 1 to 20.

Apparatuses illustrated in FIG. 21 are means that can implement the methods described before with reference to FIGS. 1 to 20.

A UE may act as a transmission end on a UL and as a reception end on a DL. An eNB may act as a reception end on a UL and as a transmission end on a DL.

That is, each of the UE and the eNB may include a transmitter (Tx) 2140 or 2150 and a receiver (Rx) 2160 or 2170, for controlling transmission and reception of information, data, and/or messages, and an antenna 2100 or 2110 for transmitting and receiving information, data, and/or messages.

Each of the UE and the eNB may further include a processor 2120 or 2130 for implementing the afore-described embodiments of the present disclosure and a memory 2180 or 2190 for temporarily or permanently storing operations of the processor 2120 or 2130.

The embodiments of the present invention may be performed using the components and functions of the UE and the base station. For example, a base station for transmitting a primary synchronization signal (PSS) in a wireless access system supporting narrowband Internet of things (NB-IoT) may include a transmitter and a processor. The processor may be configured to repeatedly generate a first sequence N times in order to generate the PSS, to multiply the N first sequences by a second sequence to generate N PSSs, and to control the transmitter to transmit the N PSSs through N orthogonal frequency division multiplexing (OFDM) symbols. At this time, a bandwidth used in the wireless access system supporting NB-IoT is one PRB, and the PRB includes 12 subcarriers in the frequency domain. In addition, the base station may transmit the N OFDM symbols with "0" filled in resource elements, to which the PSSs are not allocated. The N OFDM symbols may be included in one subframe. The N OFDM symbols may include OFDM symbols except for a control region in the subframe. The first sequence may be generated from a Zadoff-Chu (ZC) sequence. The second sequence may be determined in consideration of the number of OFDM symbols in which the PSS signals are transmitted. For detailed descriptions and technical features of the UE, refer to the embodiments described in Chapters 1 to 4.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 21 may further include a low-power radio frequency (RF)/intermediate frequency (IF) module.

Meanwhile, the UE may be any of a Personal Digital Assistant (PDA), a cellular phone, a personal communication service (PCS) phone, a global system for mobile (GSM) phone, a wideband code division multiple access (WCDMA) phone, a mobile broadband system (MBS) phone, a hand-held PC, a laptop PC, a smart phone, a multi mode-multi band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2180 or 2190 and executed by the processor 2120 or 2130. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method performed by a User Equipment (UE) for receiving a primary synchronization signal (PSS) in a wireless access system supporting narrowband Internet of things (NB-IoT), the method comprising:

receiving, by the UE from a base station, the PSS through a plurality of orthogonal frequency division multiplexing (OFDM) symbols; and performing a cell search based on the PSS, wherein the PSS is received based on applying elements of a cover code of length 11 to a Zadoff-Chu (ZC) sequence of length 11 with a root index equal to 5 in respective OFDM symbols of the plurality of OFDM symbols.

2. The method according to claim 1, wherein the plurality of OFDM symbols are assigned with "0" in resource elements, to which the PSS is not allocated.

3. The method according to claim 1, wherein the plurality of OFDM symbols are included in a subframe.

4. The method according to claim 3, wherein the plurality of OFDM symbols are OFDM symbols except for a control region in the subframe.

5. A User Equipment (UE) for receiving a primary synchronization signal (PSS) in a wireless access system supporting narrowband Internet of things (NB-IoT), the UE comprising:

a transceiver; and a processor operatively connected to the transceiver, wherein the processor is configured to:

control the receiver to receive, from a base station, the PSS through a plurality of orthogonal frequency division multiplexing (OFDM) symbols; and perform a cell search based on the PSS, wherein the PSS is received based on applying elements of a cover code of length 11 to a Zadoff-Chu (ZC) sequence of length 11 with a root index equal to 5 in respective OFDM symbols of the plurality of OFDM symbols.

6. The UE according to claim 5, wherein the plurality of OFDM symbols are assigned with "0" in resource elements, to which the PSS is not allocated.

7. The UE according to claim 5, wherein the plurality of OFDM symbols are included in a subframe.

8. The UE according to claim 7, wherein the plurality of OFDM symbols are OFDM symbols except for a control region in the subframe.

* * * * *